US007532808B2

(12) United States Patent
Lainema

(10) Patent No.: US 7,532,808 B2
(45) Date of Patent: May 12, 2009

(54) METHOD FOR CODING MOTION IN A VIDEO SEQUENCE

(75) Inventor: Jani Lainema, Irving, TX (US)

(73) Assignee: Nokia Corporation, Espoo (FI)

( * ) Notice: Subject to any disclaimer, the term of this patent is extended or adjusted under 35 U.S.C. 154(b) by 1003 days.

(21) Appl. No.: 10/390,549

(22) Filed: Mar. 14, 2003

(65) Prior Publication Data

US 2003/0202594 A1    Oct. 30, 2003

Related U.S. Application Data

(60) Provisional application No. 60/365,072, filed on Mar. 15, 2002.

(51) Int. Cl.
*H04N 5/91* (2006.01)
(52) U.S. Cl. ........................ 386/111; 386/112
(58) Field of Classification Search ................ 386/68, 386/111, 112, 95; 348/466, 699; 375/240.15
See application file for complete search history.

(56) References Cited

U.S. PATENT DOCUMENTS

| 5,148,272 A | 9/1992 | Acampora et al. ........... 358/133 |
| 5,191,436 A | 3/1993 | Yonemitsu .................. 358/335 |
| 5,442,400 A | 8/1995 | Sun et al. .................... 348/402 |
| 5,701,164 A | 12/1997 | Kato .......................... 348/699 |
| 6,683,987 B1 * | 1/2004 | Sugahara .................. 382/235 |
| 7,200,275 B2 * | 4/2007 | Srinivasan et al. .......... 382/239 |

OTHER PUBLICATIONS

"Global Motion Vector Coding (GMVC)"; Shijun Sun et al.; ITU—Telecommunications Standardization Sector, Video Coding Experts Group (VCEG); Meeting: Pattaya, Thailand, Dec. 4-7, 2001; pp. 1-6.
"Joint Model Number 1 (JM-1)"; Doc. JVT-A003; Joint VideoTeam of ISO/IEC and ITU-T VCEG; Jan. 2002; pp. 1-79.
Acta of Zhongshan University, vol. 40, No. 2; L. Hongmei et al.; "An Improved Multiresolution Motion Estimation Algorithm"; pp. 34-37; Mar. 2001.
ITU Telecommunications Standardization Sector, Doc. VCEG-N77; S. Sun et al; "Motion Vector Coding with Global Motion Parameters"; pp. 1-11; Fourteenth Meeting: Santa Barbara, CA, USA, Sep. 24-28, 2001.

(Continued)

*Primary Examiner*—Huy T Nguyen
(74) *Attorney, Agent, or Firm*—Ware, Fressola, Van Der Sluys & Adolphson, LLP

(57) ABSTRACT

A method of motion-compensated video encoding that enables a video sequence with a global motion component to be encoded in an efficient manner. A video encoder is arranged to assign macroblocks to be coded to specific coding modes including a skip mode, which is used to indicate one of two possible types of macroblock motion: a) zero motion, or b) global or regional motion. As each macroblock is encoded, a previously encoded region surrounding the macroblock is examined and the characteristics of motion in that region determined. With the skip mode, the macroblock to be coded and a motion vector describing the global motion or regional motion is associated with the macroblock if the motion in the region is characteristic of global motion or regional motion. If the region exhibits an insignificant level of motion, a zero valued motion vector is associated with the macroblock.

65 Claims, 10 Drawing Sheets

OTHER PUBLICATIONS

ITU Telecommunications Standardization Sector, Doc. VCEG-N16; S. Sun et al; "Core Experiment description: Motion Vector Coding with Global Motion Parameters"; pp. 1-6; Fourteenth Meeting: Santa Barbara, CA, USA, Sep. 24-28, 2001.

Joint Photography Expert Group Conference, Crowborough JPEG Forum Ltd, GB, Specialists Group on Coding for Visual Telephony Joint Photographic Expert Group; "Description of Ref. Model 8 (RM8)"; pp. 1-72; Jun. 9, 1989.

* cited by examiner

METHOD FOR CODING MOTION IN A VIDEO SEQUENCE

This application claims the benefit of U.S. Provisionl Application No. 60/365,072 filed Mar. 15, 2002.

FIELD OF THE INVENTION

The invention relates generally to communication systems and more particularly to motion compensation in video coding.

BACKGROUND OF THE INVENTION

A digital video sequence, like an ordinary motion picture recorded on film, comprises a sequence of still images, the illusion of motion being created by displaying consecutive images of the sequence one after the other at a relatively fast rate, typically 15 to 30 frames per second. Because of the relatively fast frame display rate, images in consecutive frames tend to be quite similar and thus contain a considerable amount of redundant information. For example, a typical scene may comprise some stationary elements, such as background scenery, and some moving areas, which may take many different forms, for example the face of a newsreader, moving traffic and so on. Alternatively, or additionally, so-called "global motion" may be present in the video sequence, for example due to translation, panning or zooming of the camera recording the scene. However, in many cases, the overall change between one video frame and the next is rather small.

Each frame of an uncompressed digital video sequence comprises an array of image pixels. For example, in a commonly used digital video format, known as the Quarter Common Interchange Format (QCIF), a frame comprises an array of 176×144 pixels, in which case each frame has 25,344 pixels. In turn, each pixel is represented by a certain number of bits, which carry information about the luminance and/or color content of the region of the image corresponding to the pixel. Commonly, a so-called YUV color model is used to represent the luminance and chrominance content of the image. The luminance, or Y, component represents the intensity (brightness) of the image, while the color content of the image is represented by two chrominance or color difference components, labelled U and V.

Color models based on a luminance/chrominance representation of image content provide certain advantages compared with color models that are based on a representation involving primary colors (that is Red, Green and Blue, RGB). The human visual system is more sensitive to intensity variations than it is to color variations and YUV color models exploit this property by using a lower spatial resolution for the chrominance components (U, V) than for the luminance component (Y). In this way, the amount of information needed to code the color information in an image can be reduced with an acceptable reduction in image quality.

The lower spatial resolution of the chrominance components is usually attained by spatial sub-sampling. Typically, each frame of a video sequence is divided into so-called "macroblocks", which comprise luminance (Y) information and associated (spatially sub-sampled) chrominance (U, V) information. FIG. 3 illustrates one way in which macroblocks can be formed. FIG. 3a shows a frame of a video sequence represented using a YUV color model, each component having the same spatial resolution. Macroblocks are formed by representing a region of 16×16 image pixels in the original image (FIG. 3b) as four blocks of luminance information, each luminance block comprising an 8×8 array of luminance (Y) values and two spatially corresponding chrominance components (U and V) which are sub-sampled by a factor of two in the horizontal and vertical directions to yield corresponding arrays of 8×8 chrominance (U, V) values (see FIG. 3c).

A QCIF image comprises 11×9 macroblocks. If the luminance blocks and chrominance blocks are represented with 8 bit resolution (that is by numbers in the range 0 to 255), the total number of bits required per macroblock is (16×16×8)+2×(8×8×8)=3072 bits. The number of bits needed to represent a video frame in QCIF format is thus 99×3072=304,128 bits. This means that the amount of data required to transmit/record/display an uncompressed video sequence in QCIF format, represented using a YUV color model, at a rate of 30 frames per second, is more than 9 Mbps (million bits per second). This is an extremely high data rate and is impractical for use in video recording, transmission and display applications because of the very large storage capacity, transmission channel capacity and hardware performance required.

If video data is to be transmitted in real-time over a fixed line network such as an ISDN (Integrated Services Digital Network) or a conventional PSTN (Public Switched Telephone Network), the available data transmission bandwidth is typically of the order of 64 kbits/s. In mobile videotelephony, where transmission takes place at least in part over a radio communications link, the available bandwidth can be as low as 20 kbits/s. This means that a significant reduction in the amount of information used to represent video data must be achieved in order to enable transmission of digital video sequences over low bandwidth communication networks. For this reason, video compression techniques have been developed which reduce the amount of information transmitted while retaining an acceptable image quality.

Video compression methods are based on reducing the redundant and perceptually irrelevant parts of video sequences. The redundancy in video sequences can be categorised into spatial, temporal and spectral redundancy. "Spatial redundancy" is the term used to describe the correlation (similarity) between neighbouring pixels within a frame. The term "temporal redundancy" expresses the fact that objects appearing in one frame of a sequence are likely to appear in subsequent frames, while "spectral redundancy" refers to the correlation between different color components of the same image.

Sufficiently efficient compression cannot usually be achieved by simply reducing the various forms of redundancy in a given sequence of images. Thus, most current video encoders also reduce the quality of those parts of the video sequence which are subjectively the least important. In addition, the redundancy of the compressed video bit-stream itself is reduced by means of efficient loss-less encoding. Generally, this is achieved using a technique known as entropy coding.

There is often a significant amount of spatial redundancy between the pixels that make up each frame of a digital video sequence. In other words, the value of any pixel within a frame of the sequence is substantially the same as the value of other pixels in its immediate vicinity. Typically, video coding systems reduce spatial redundancy using a technique known as "block-based transform coding", in which a mathematical transformation, such as a two-dimensional Discrete Cosine Transform (DCT), is applied to blocks of image pixels. This transforms the image data from a representation comprising pixel values to a form comprising a set of coefficient values representative of spatial frequency components significantly reducing spatial redundancy and thereby producing a more compact representation of the image data.

Frames of a video sequence which are compressed using block-based transform coding, without reference to any other frame within the sequence, are referred to as INTRA-coded or I-frames. Additionally, and where possible, blocks of INTRA-coded frames are predicted from previously coded blocks within the same frame. This technique, known as INTRA-prediction, has the effect of further reducing the amount of data required to represent an INTRA-coded frame.

Generally, video coding systems not only reduce the spatial redundancy within individual frames of a video sequence, but also make use of a technique known as "motion-compensated prediction", to reduce the temporal redundancy in the sequence. Using motion-compensated prediction, the image content of some (often many) frames in a digital video sequence is "predicted" from one or more other frames in the sequence, known as "reference" frames. Prediction of image content is achieved by tracking the motion of objects or regions of an image between a frame to be coded (compressed) and the reference frame(s) using "motion vectors". In general, the reference frame(s) may precede the frame to be coded or may follow it in the video sequence. As in the case of INTRA-coding, motion compensated prediction of a video frame is typically performed macroblock-by-macroblock.

Frames of a video sequence which are compressed using motion-compensated prediction are generally referred to as INTER-coded or P-frames. Motion-compensated prediction alone rarely provides a sufficiently precise representation of the image content of a video frame and therefore it is typically necessary to provide a so-called "prediction error" (PE) frame with each INTER-coded frame. The prediction error frame represents the difference between a decoded version of the INTER-coded frame and the image content of the frame to be coded. More specifically, the prediction error frame comprises values that represent the difference between pixel values in the frame to be coded and corresponding reconstructed pixel values formed on the basis of a predicted version of the frame in question. Consequently, the prediction error frame has characteristics similar to a still image and block-based transform coding can be applied in order to reduce its spatial redundancy and hence the amount of data (number of bits) required to represent it.

In order to illustrate the operation of a generic video coding system in greater detail, reference will now be made to the exemplary video encoder and video decoder illustrated in FIGS. 1 and 2 of the accompanying drawings. The video encoder 100 of FIG. 1 employs a combination of INTRA- and INTER-coding to produce a compressed (encoded) video bit-stream and decoder 200 of FIG. 2 is arranged to receive and decode the video bit-stream produced by encoder 100 in order to produce a reconstructed video sequence. Throughout the following description it will be assumed that the luminance component of a macroblock comprises 16×16 pixels arranged as an array of 4, 8×8 blocks, and that the associated chrominance components are spatially sub-sampled by a factor of two in the horizontal and vertical directions to form 8×8 blocks, as depicted in FIG. 3. Extension of the description to other block sizes and other sub-sampling schemes will be apparent to those of ordinary skill in the art.

The video encoder 100 comprises an input 101 for receiving a digital video signal from a camera or other video source (not shown). It also comprises a transformation unit 104 which is arranged to perform a block-based discrete cosine transform (DCT), a quantizer 106, an inverse quantizer 108, an inverse transformation unit 110, arranged to perform an inverse block-based discrete cosine transform (IDCT), combiners 112 and 116, and a frame store 120. The encoder further comprises a motion estimator 130, a motion field coder 140 and a motion compensated predictor 150. Switches 102 and 114 are operated co-operatively by control manager 160 to switch the encoder between an INTRA-mode of video encoding and an INTER-mode of video encoding. The encoder 100 also comprises a video multiplex coder 170 which forms a single bit-stream from the various types of information produced by the encoder 100 for further transmission to a remote receiving terminal or, for example, for storage on a mass storage medium, such as a computer hard drive (not shown).

Encoder 100 operates as follows. Each frame of uncompressed video provided from the video source to input 101 is received and processed macroblock by macroblock, preferably in raster-scan order. When the encoding of a new video sequence starts, the first frame to be encoded is encoded as an INTRA-coded frame. Subsequently, the encoder is programmed to code each frame in INTER-coded format, unless one of the following conditions is met: 1) it is judged that the current macroblock of the frame being coded is so dissimilar from the pixel values in the reference frame used in its prediction that excessive prediction error information is produced, in which case the current macroblock is coded in INTRA-coded format; 2) a predefined INTRA frame repetition interval has expired; or 3) feedback is received from a receiving terminal indicating a request for a frame to be provided in INTRA-coded format.

The occurrence of condition 1) is detected by monitoring the output of the combiner 116. The combiner 116 forms a difference between the current macroblock of the frame being coded and its prediction, produced in the motion compensated prediction block 150. If a measure of this difference (for example a sum of absolute differences of pixel values) exceeds a predetermined threshold, the combiner 116 informs the control manager 160 via a control line 119 and the control manager 160 operates the switches 102 and 114 via control line 113 so as to switch the encoder 100 into INTRA-coding mode. In this way, a frame which is otherwise encoded in INTER-coded format may comprise INTRA-coded macroblocks. Occurrence of condition 2) is monitored by means of a timer or frame counter implemented in the control manager 160, in such a way that if the timer expires, or the frame counter reaches a predetermined number of frames, the control manager 160 operates the switches 102 and 114 via control line 113 to switch the encoder into INTRA-coding mode. Condition 3) is triggered if the control manager 160 receives a feedback signal from, for example, a receiving terminal, via control line 121 indicating that an INTRA frame refresh is required by the receiving terminal. Such a condition may arise, for example, if a previously transmitted frame is badly corrupted by interference during its transmission, rendering it impossible to decode at the receiver. In this situation, the receiving decoder issues a request for the next frame to be encoded in INTRA-coded format, thus re-initialising the coding sequence.

Operation of the encoder 100 in INTRA-coding mode will now be described. In INTRA-coding mode, the control manager 160 operates the switch 102 to accept video input from input line 118. The video signal input is received macroblock by macroblock from input 101 via the input line 118. As they are received, the blocks of luminance and chrominance values which make up the macroblock are passed to the DCT transformation block 104, which performs a 2-dimensional discrete cosine transform on each block of values, producing a 2-dimensional array of DCT coefficients for each block. DCT transformation block 104 produces an array of coefficient values for each block, the number of coefficient values corresponding to the dimensions of the blocks which make up the macroblock (in this case 8×8). The DCT coefficients for each block are passed to the quantizer 106, where they are quantized using a quantization parameter QP. Selection of the quantization parameter QP is controlled by the control manager 160 via control line 115.

The array of quantized DCT coefficients for each block is then passed from the quantizer 106 to the video multiplex coder 170, as indicated by line 125 in FIG. 1. The video multiplex coder 170 orders the quantized transform coefficients for each block using a zigzag scanning procedure, thereby converting the two-dimensional array of quantized transform coefficients into a one-dimensional array. Each non-zero valued quantized coefficient in the one dimensional array is then represented as a pair of values, referred to as level and run, where level is the value of the quantized coefficient and run is the number of consecutive zero-valued coefficients preceding the coefficient in question. The run and level values are further compressed in the video multiplex coder 170 using entropy coding, for example, variable length coding (VLC), or arithmetic coding.

Once the run and level values have been entropy coded using an appropriate method, the video multiplex coder 170 further combines them with control information, also entropy coded using a method appropriate for the kind of information in question, to form a single compressed bit-stream of coded image information 135. It should be noted that while entropy coding has been described in connection with operations performed by the video multiplex coder 170, in alternative implementations a separate entropy coding unit may be provided.

A locally decoded version of the macroblock is also formed in the encoder 100. This is done by passing the quantized transform coefficients for each block, output by quantizer 106, through inverse quantizer 108 and applying an inverse DCT transform in inverse transformation block 110. In this way a reconstructed array of pixel values is constructed for each block of the macroblock. The resulting decoded image data is input to combiner 112. In INTRA-coding mode, switch 114 is set so that the input to the combiner 112 via switch 114 is zero. In this way, the operation performed by combiner 112 is equivalent to passing the decoded image data unaltered.

As subsequent macroblocks of the current frame are received and undergo the previously described encoding and local decoding steps in blocks 104, 106, 108, 110 and 112, a decoded version of the INTRA-coded frame is built up in frame store 120. When the last macroblock of the current frame has been INTRA-coded and subsequently decoded, the frame store 120 contains a completely decoded frame, available for use as a motion prediction reference frame in coding a subsequently received video frame in INTER-coded format.

Operation of the encoder 100 in INTER-coding mode will now be described. In INTER-coding mode, the control manager 160 operates switch 102 to receive its input from line 117, which comprises the output of combiner 116. The combiner 116 receives the video input signal macroblock by macroblock from input 101. As combiner 116 receives the blocks of luminance and chrominance values which make up the macroblock, it forms corresponding blocks of prediction error information. The prediction error information represents the difference between the block in question and its prediction, produced in motion compensated prediction block 150. More specifically, the prediction error information for each block of the macroblock comprises a two-dimensional array of values, each of which represents the difference between a pixel value in the block of luminance or chrominance information being coded and a decoded pixel value obtained by forming a motion-compensated prediction for the block, according to the procedure to be described below. Thus, in the exemplary video coding system considered here where each macroblock comprises, for example, an assembly of 8×8 blocks comprising luminance and chrominance values, the prediction error information for each block of the macroblock similarly comprises an 8×8 array of prediction error values.

The prediction error information for each block of the macroblock is passed to DCT transformation block 104, which performs a two-dimensional discrete cosine transform on each block of prediction error values to produce a two-dimensional array of DCT transform coefficients for each block. DCT transformation block 104 produces an array of coefficient values for each prediction error block, the number of coefficient values corresponding to the dimensions of the blocks which make up the macroblock (in this case 8×8). The transform coefficients derived from each prediction error block are passed to quantizer 106 where they are quantized using a quantization parameter QP, in a manner analogous to that described above in connection with operation of the encoder in INTRA-coding mode. As before, selection of the quantization parameter QP is controlled by the control manager 160 via control line 115.

The quantized DCT coefficients representing the prediction error information for each block of the macroblock are passed from quantizer 106 to video multiplex coder 170, as indicated by line 125 in FIG. 1. As in INTRA-coding mode, the video multiplex coder 170 orders the transform coefficients for each prediction error block using a certain zigzag scanning procedure and then represents each non-zero valued quantized coefficient as a run-level pair. It further compresses the run-level pairs using entropy coding, in a manner analogous to that described above in connection with INTRA-coding mode. Video multiplex coder 170 also receives motion vector information (described in the following) from motion field coding block 140 via line 126 and control information from control manager 160. It entropy codes the motion vector information and control information and forms a single bit-stream of coded image information, 135 comprising the entropy coded motion vector, prediction error and control information.

The quantized DCT coefficients representing the prediction error information for each block of the macroblock are also passed from quantizer 106 to inverse quantizer 108. Here they are inverse quantized and the resulting blocks of inverse quantized DCT coefficients are applied to inverse DCT transform block 110, where they undergo inverse DCT transformation to produce locally decoded blocks of prediction error values. The locally decoded blocks of prediction error values are then input to combiner 112. In INTER-coding mode, switch 114 is set so that the combiner 112 also receives predicted pixel values for each block of the macroblock, generated by motion-compensated prediction block 150. The combiner 112 combines each of the locally decoded blocks of prediction error values with a corresponding block of predicted pixel values to produce reconstructed image blocks and stores them in frame store 120.

As subsequent macroblocks of the video signal are received from the video source and undergo the previously described encoding and decoding steps in blocks 104, 106, 108, 110, 112, a decoded version of the frame is built up in frame store 120. When the last macroblock of the frame has been processed, the frame store 120 contains a completely decoded frame, available for use as a motion prediction reference frame in encoding a subsequently received video frame in INTER-coded format.

The details of the motion-compensated prediction performed by video encoder 100 will now be considered.

Any frame encoded in INTER-coded format requires a reference frame for motion-compensated prediction. This means, necessarily, that when encoding a video sequence, the first frame to be encoded, whether it is the first frame in the sequence, or some other frame, must be encoded in INTRA-coded format. This, in turn, means that when the video encoder 100 is switched into INTER-coding mode by control manager 160, a complete reference frame, formed by locally decoding a previously encoded frame, is already available in the frame store 120 of the encoder. In general, the reference frame is formed by locally decoding either an INTRA-coded frame or an INTER-coded frame.

In the following description it will be assumed that the encoder performs motion compensated prediction on a macroblock basis, i.e. a macroblock is the smallest element of a video frame that can be associated with motion information. It will further be assumed that a prediction for a given macroblock is formed by identifying a region of 16×16 values in the luminance component of the reference frame that shows best correspondence with the 16×16 luminance values of the macroblock in question. Motion-compensated prediction in a video coding system where motion information may be associated with elements smaller than a macroblock will be considered later in the text.

The first step in forming a prediction for a macroblock of the current frame is performed by motion estimation block 130. The motion estimation block 130 receives the blocks of luminance and chrominance values which make up the current macroblock of the frame to be coded via line 128. It then performs a block matching operation in order to identify a region in the reference frame that corresponds best with the current macroblock. In order to perform the block matching operation, motion estimation block 130 accesses reference frame data stored in frame store 120 via line 127. More specifically, motion estimation block 130 performs block-matching by calculating difference values (e.g. sums of absolute differences) representing the difference in pixel values between the macroblock under examination and candidate best-matching regions of pixels from a reference frame stored in the frame store 120. A difference value is produced for candidate regions at all possible offsets within a predefined search region of the reference frame and motion estimation block 130 determines the smallest calculated difference value. The candidate region that yields the smallest difference value is selected as the best-matching region. The offset between the current macroblock and the best-matching region identified in the reference frame defines a "motion vector" for the macroblock in question. The motion vector typically comprises a pair of numbers, one describing the horizontal ($\Delta x$) between the current macroblock and the best-matching region of the reference frame, the other representing the vertical displacement ($\Delta y$).

Once the motion estimation block 130 has produced a motion vector for the macroblock, it outputs the motion vector to the motion field coding block 140. The motion field coding block 140 approximates the motion vector received from motion estimation block 130 using a motion model comprising a set of basis functions and motion coefficients. More specifically, the motion field coding block 140 represents the motion vector as a set of motion coefficient values which, when multiplied by the basis functions, form an approximation of the motion vector. Typically, a translational motion model having only two motion coefficients and basis functions is used, but motion models of greater complexity may also be used.

The motion coefficients are passed from motion field coding block 140 to motion compensated prediction block 150. Motion compensated prediction block 150 also receives the best-matching region of pixel values identified by motion estimation block 130 from frame store 120. Using the approximate representation of the motion vector generated by motion field coding block 140 and the pixel values of the best-matching region of pixels from the reference frame, motion compensated prediction block 150 generates an array of predicted pixel values for each block of the current macroblock. Each block of predicted pixel values is passed to combiner 116 where the predicted pixel values are subtracted from the actual (input) pixel values in the corresponding block of the current macroblock. In this way a set of prediction error blocks for the macroblock is obtained.

Operation of the video decoder 200, shown in FIG. 2 will now be described. The decoder 200 comprises a video multiplex decoder 270, which receives an encoded video bit-stream 135 from the encoder 100 and demultiplexes it into its constituent parts, an inverse quantizer 210, an inverse DCT transformer 220, a motion compensated prediction block 240, a frame store 250, a combiner 230, a control manager 260, and an output 280.

The control manager 260 controls the operation of the decoder 200 in response to whether an INTRA- or an INTER-coded frame is being decoded. An INTRA/INTER trigger control signal, which causes the decoder to switch between decoding modes is derived, for example, from picture type information associated with each compressed video frame received from the encoder. The INTRA/INTER trigger control signal is extracted from the encoded video bit-stream by the video multiplex decoder 270 and is passed to control manager 260 via control line 215.

Decoding of an INTRA-coded frame is performed on a macroblock-by-macroblock basis, each macroblock being decoded substantially as soon as encoded information relating to it is received in the video bit-stream 135. The video multiplex decoder 270 separates the encoded information for the blocks of the macroblock from possible control information relating to the macroblock in question. The encoded information for each block of an INTRA-coded macroblock comprises variable length codewords representing the entropy coded level and run values for the non-zero quantized DCT coefficients of the block. The video multiplex decoder 270 decodes the variable length codewords using a variable length decoding method corresponding to the encoding method used in the encoder 100 and thereby recovers the level and run values. It then reconstructs the array of quantized transform coefficient values for each block of the macroblock and passes them to inverse quantizer 210. Any control information relating to the macroblock is also decoded in the video multiplex decoder 270 using an appropriate decoding method and is passed to control manager 260. In particular, information relating to the level of quantization applied to the transform coefficients is extracted from the encoded bit-stream by video multiplex decoder 270 and provided to control manager 260 via control line 217. The control manager, in turn, conveys this information to inverse quantizer 210 via control line 218. Inverse quantizer 210 inverse quantizes the quantized DCT coefficients for each block of the macroblock according to the control information and provides the now inverse quantized DCT coefficients to inverse DCT transformer 220.

Inverse DCT transformer 220 performs an inverse DCT transform on the inverse quantized DCT coefficients for each block of the macroblock to form a decoded block of image information comprising reconstructed pixel values. The reconstructed pixel values for each block of the macroblock are passed via combiner 230 to the video output 280 of the decoder where, for example, they can be provided to a display device (not shown). The reconstructed pixel values for each block are also stored in frame store 250. Because motion-compensated prediction is not used in the encoding/decoding of INTRA coded macroblocks control manager 260 controls combiner 230 to pass each block of pixel values as such to the video output 280 and frame store 250. As subsequent macroblocks of the INTRA-coded frame are decoded and stored, a decoded frame is progressively assembled in the frame store 250 and thus becomes available for use as a reference frame for motion compensated prediction in connection with the decoding of subsequently received INTER-coded frames.

INTER-coded frames are also decoded macroblock by macroblock, each INTER-coded macroblock being decoded substantially as soon as encoded information relating to it is received in the bit-stream 135. The video multiplex decoder 270 separates the encoded prediction error information for each block of an INTER-coded macroblock from encoded motion vector information and possible control information relating to the macroblock in question. As explained in the foregoing, the encoded prediction error information for each block of the macroblock comprises variable length codewords representing the entropy coded level and run values for the non-zero quantized transform coefficients of the prediction error block in question. The video multiplex decoder 270 decodes the variable length codewords using a variable length decoding method corresponding to the encoding method used in the encoder 100 and thereby recovers the level and run values. It then reconstructs an array of quantized transform coefficient values for each prediction error block and passes them to inverse quantizer 210. Control information relating to the INTER-coded macroblock is also decoded in the video multiplex decoder 270 using an appropriate decoding method and is passed to control manager 260. Information relating to the level of quantization applied to the transform coefficients of the prediction error blocks is extracted from the encoded bit-stream and provided to control manager 260 via control line 217. The control manager, in turn, conveys this information to inverse quantizer 210 via control line 218. Inverse quantizer 210 inverse quantizes the quantized DCT coefficients representing the prediction error information for each block of the macroblock according to the control information and provides the now inverse quantized DCT coefficients to inverse DCT transformer 220. The inverse quantized DCT coefficients representing the prediction error information for each block are then inverse transformed in the inverse DCT transformer 220 to yield an array of reconstructed prediction error values for each block of the macroblock.

The encoded motion vector information associated with the macroblock is extracted from the encoded video bit-stream 135 by video multiplex decoder 270 and is decoded. The decoded motion vector information thus obtained is passed via control line 225 to motion compensated prediction block 240, which reconstructs a motion vector for the macroblock using the same motion model as that used to encode the INTER-coded macroblock in encoder 100. The reconstructed motion vector approximates the motion vector originally determined by motion estimation block 130 of the encoder. The motion compensated prediction block 240 of the decoder uses the reconstructed motion vector to identify the location of a region of reconstructed pixels in a prediction reference frame stored in frame store 250. The reference frame may be, for example, a previously decoded INTRA-coded frame, or a previously decoded INTER-coded frame. In either case, the region of pixels indicated by the reconstructed motion vector is used to form a prediction for the macroblock in question. More specifically, the motion compensated prediction block 240 forms an array of pixel values for each block of the macroblock by copying corresponding pixel values from the region of pixels identified by the motion vector. The prediction, that is the blocks of pixel values derived from the reference frame, are passed from motion compensated prediction block 240 to combiner 230 where they are combined with the decoded prediction error information. In practice, the pixel values of each predicted block are added to corresponding reconstructed prediction error values output by inverse DCT transformer 220. In this way an array of reconstructed pixel values for each block of the macroblock is obtained. The reconstructed pixel values are passed to the video output 280 of the decoder and are also stored in frame store 250. As subsequent macroblocks of the INTER-coded frame are decoded and stored, a decoded frame is progressively assembled in the frame store 250 and thus becomes available for use as a reference frame for motion-compensated prediction of other INTER-coded frames.

As explained above, in a typical video coding system, motion compensated prediction is performed on a macroblock basis, such that a macroblock is the smallest element of a video frame that can be associated with motion information. However, the video coding recommendation currently being developed by the Joint Video Team (JVT) of ISO/IEC MPEG (Motion Pictures Expert Group) and ITU-T VCEG (Video Coding Experts Group), allows motion information to be associated with elements smaller than a macroblock. In the following description, and throughout the remainder of the text, reference will be made to the version of this video coding standard described in the document by T. Weigland: "Joint Model Number 1", Doc. JVT-A003, Joint Video Team of ISO/IEC MPEG and ITU-T VCEG, January 2002, said document being included herein in its entirety. For simplicity, this version of the recommendation will be referred to as "JM1 of the JVT codec".

According to JM1 of the JVT codec, video pictures are divided into macroblocks of 16×16 pixels and are coded on a macroblock-by-macroblock basis. The coding performed follows the basic principles described above in connection with the generic video encoder and decoder of FIGS. 1 and 2. However, according to JM1, motion compensated prediction of INTER coded macroblocks is performed in manner that differs from that previously described. More specifically, each of the macroblocks is assigned a "coding mode" depending on the characteristics of the macroblock and the motion in the video sequence. Seven of the coding modes are based on dividing a macroblock to be INTER coded into a number of sub-blocks, each comprising N×M pixels, and associating motion information with each of the N×M sub-blocks, not just with the macroblock as a whole. Each of the possible schemes for dividing a macroblock into N×M sub-blocks, provided by JM1 of the JVT video codec, is illustrated in FIG. 4 of the accompanying drawings. As can be seen from the figure, the possible divisions are: 16×16, 8×16, 16×8, 8×8, 4×8, 8×4 and 4×4. Thus, if the coding mode assigned to a particular macroblock is, for example, the 16×8 mode, the macroblock is divided into two sub-blocks of size 16×8 pixels each and both sub-blocks is provided with its own motion information. In addition, an eighth coding mode, known as SKIP (or skip) mode, is provided. If this mode is assigned to a macroblock, this indicates that the macroblock is to be copied from the reference video frame without using motion compensated prediction.

The decision relating to the choice of coding mode for a given macroblock is typically made as part of the motion estimation process. More specifically, in a video encoder such as that illustrated in FIG. 1, but implemented to allow the use of different coding modes according to JM1 of the JVT codec, the motion estimation process performed by motion estimation block 130 is repeated for each possible division of the macroblock into N×M sub-blocks and for the skip mode. The motion estimation for the skip mode is a very simple one, since no motion search is needed, but a constant zero valued vector is assigned for this mode. For the rest of the INTER modes the motion is typically estimated by performing a block matching operation for each motion block inside the macroblock. After these operations, the mode that minimizes a certain cost function is selected for the macroblock. The cost function typically combines the prediction error with number of estimated bits needed to code the macroblock and thus measures the relative efficiency of each coding mode.

Because a video encoder operating in accordance with JM1 of the JVT codec assigns a particular coding mode to each macroblock that is INTER coded, it is necessary for a corresponding video decoder to be aware of that coding mode in order for it to correctly decode received information relating to the macroblock in question. Therefore, an indication of the coding mode assigned to each macroblock is provided in the video bit-stream transmitted from the video encoder to the video decoder. In order to minimise the amount of data required to indicate the coding modes, the coding mode for each macroblock is indicated using variable length coding. The codewords indicating the coding modes are assigned in such a way that the shortest codeword is used to represent the coding mode that is statistically most likely to occur. JM1 of the JVT codec uses a single set of so-called "Universal Variable Length Codes" (UVLC) to represent all syntax (data) elements in the video bit-stream and therefore this set of codewords is also used to represent the coding mode information for INTER coded macroblocks. The UVLC codewords used in JM1 may be written in the following compressed form, shown in Table 1 below, where the $x_n$ terms take either the value 0 or 1:

TABLE 1

|   |   |   |   |   |   |   | 1 |   |   |   |   |   |
|---|---|---|---|---|---|---|---|---|---|---|---|---|
|   |   |   |   |   | 0 | $x_0$ | 1 |   |   |   |   |   |
|   |   |   | 0 | $x_1$ | 0 | $x_0$ | 1 |   |   |   |   |   |
|   | 0 | $x_2$ | 0 | $x_1$ | 0 | $x_0$ | 1 |   |   |   |   |   |
| 0 | $x_3$ | 0 | $x_2$ | 0 | $x_1$ | 0 | $x_0$ | 1 |   |   |   |   |

Scheme for Generation of UVLC Codewords According to JM1 of the JVT Codec

Table 2 presents the first 16 UVLC codewords, generated according to the scheme presented in Table 1.

| Codeword Index | UVLC Codeword |
|---|---|
| 0 | 1 |
| 1 | 001 |
| 2 | 011 |

TABLE 2

| 3 | 00001 |
|---|---|
| 4 | 00011 |
| 5 | 01001 |
| 6 | 01011 |
| 7 | 0000001 |
| 8 | 0000011 |
| 9 | 0001001 |
| 10 | 0001011 |
| 11 | 0100001 |
| 12 | 0100011 |
| 13 | 0101001 |
| 14 | 0101011 |
| 15 | 000000001 |
| ... | ... |

The First 16 UVLC Codewords of JM1 Generated According to the Scheme Presented in Table 1

JM1 of the JVT codec assumes that the skip mode is statistically the most likely coding mode for a macroblock. The number of skip mode macroblocks before the next macroblock with non-SKIP mode is indicated by a single UVLC codeword using Table 2 above. The remaining coding modes are represented by UVLC codewords as shown in Table 3 below:

TABLE 3

Macroblock Coding Modes of JM1

| Codeword Index | Mode | UVLC Ccodeword |
|---|---|---|
| — | SKIP | Run-Length Coded |
| 0 | 16 × 16 | 1 |
| 1 | 16 × 8 | 001 |
| 2 | 8 × 16 | 011 |
| 3 | 8 × 8 | 00001 |
| 4 | 8 × 4 | 00011 |
| 5 | 4 × 8 | 01001 |
| 6 | 4 × 4 | 01011 |

As previously described, the N×M modes in the table above indicate the size of the motion blocks.

A problem with the approach adopted in JM1 of the JVT codec is that the assumption that skip mode is always the most probable is not valid. If the video sequence contains global motion (panning, zooming, etc.), skip mode is actually never used. In these cases compression efficiency is seriously degraded, especially at lower bit-rates, since the codec is forced to use high overhead Mmacroblock coding modes.

Two prior art solutions for improving the coding efficiency of motion compensated prediction in the presence of global motion are known. The first of these is known as "global motion compensation" and is used, for example, in the ISO MPEG-4 and ITU-T H.263+ video coding standards. The second method is described in the document entitled "Global Motion Vector Coding" by Shijun Sun and Shawmin Lei, Doc. VCEG-20, ITU-T Video Coding Experts Group (VCEG) Meeting, Pattaya, Thailand 4-7 Dec. 2001, included herein by reference. The basic concepts of these two methods will now be briefly described.

As described in Annex P "Reference Picture Resampling" of International Telecommunications Union ITU-T Recommendation H.263 "Video Coding for Low Bit-Rate Communication", February 1998, the idea behind global motion compensation is to generate a reference frame for motion compensation that cancels the effects of global motion. In order to do this, complex operations are needed in the decoder to warp the reference frame into a more usable form. Furthermore, additional information has to be sent to the decoder to guide the building of new reference frames for global motion compensation. More specifically, the global motion compensation scheme employed in the H.263 video coding standard uses a resampling process to generate a warped version of the reference frame for use in motion-compensated prediction of the current picture. This warped version of the reference frame may include alterations in the shape, size, and location with respect to the current picture. The resampling process is defined in terms of a mapping between the four corners of the current picture and the corresponding four corners of the reference frame. Assuming that the luminance component of the current picture has a horizontal size H and vertical size V, the mapping is performed by defining four conceptual motion vectors $v^{00}$, $v^{H0}$, $v^{0V}$, and $v^{HV}$, each conceptual motion vector describing how to move one of the four corners of the current picture in such a way as to map it onto the corresponding corner of the reference frame. This operation is illustrated in FIG. 5. Motion compensated prediction for a macroblock of the current picture is then performed using block-matching with respect to the warped reference frame. This complicates the block matching process, as the value of each pixel of the warped reference frame used in the block matching process must be generated by mapping pixel values in the original (non-warped) reference frame into the co-ordinates of the warped reference frame. This is done using bilinear interpolation, which is a computationally intensive operation. The reader is referred to Annex P of the H.263 video coding standard for further details of the bilinear interpolation process used to generate the pixel values of the warped reference frame.

Global motion vector coding, as described in document VCEG-O20, referred to above, is a simplified version of global motion compensation. The reference frame is used as it is, but additional information is transmitted to describe the global motion and additional macroblock modes are used to indicate when global motion vectors are used. This approach is less complex than the global motion compensation technique just described, but there is additional encoder complexity associated with it. Namely, the encoder must perform extra motion estimation operations to find the global motion parameters and it also needs to evaluate more macroblock modes to find the optimal one. Moreover, the amount of extra global motion information that needs to be transmitted becomes large for small resolution video.

In view of the preceding discussion, it should be appreciated that there exists a significant unresolved technical problem relating to the coding of a digital video sequence in the presence of global motion, such as translation, panning or zooming of the camera. In particular, each of the three previously described prior art video coding solutions has some form of technical shortcoming. JM1 of the JVT codec, for example, has no special provision for taking account of global motion in video sequences. Therefore, when such motion is present it causes the video encoder to select macroblock coding modes that explicitly model the motion. This leads to a significant degradation in coding efficiency, as the global motion component is encoded in every INTER coded macroblock (or sub-block). The technique of global motion compensation (as provided by Annex P of the H.263 video coding standard) takes global motion into account by warping reference frames used in motion compensated prediction and therefore provides improved coding efficiency compared with a system in which no special measures are taken to code global motion. However, the warping process is computationally complex and additional information must be transmitted in the encoded video bit-stream to enable correct decoding of the video sequence. Although the related technique of global motion vector coding is computationally less demanding than global motion compensation, it does involve a certain increase in encoder complexity and additional information must be still transmitted in the video bit-stream to enable correct decoding of the video data.

It is therefore one purpose of the present invention to combine the simplicity of local motion compensation with the coding efficiency of global motion compensation to yield a video coding system with significantly improved compression performance and a negligible increase in complexity.

SUMMARY OF THE INVENTION

In order to overcome, or at least mitigate to a large extent the problems associated with the coding of global motion in prior art video coding systems, the present invention is based on a redefinition of the skip mode concept used in JM1 of the JVT codec. The method according to the invention not only provides an improvement in coding efficiency in the presence of global motion (i.e. motion affecting the entire area of video frame), but also enables regional motion to be represented in an efficient manner.

According to the invention, the skip mode concept is redefined in such a way that a macroblock assigned to skip mode is either associated with a zero (non-active) motion vector, in which case it is treated in the same way as a conventional skip mode macroblock and copied directly from the reference frame, or it is associated with a non-zero (active) motion vector. The decision as to whether a macroblock should be associated with a zero or non-zero motion vector is made by analysing the motion of other macroblocks or sub-blocks in a region surrounding the macroblock to be coded. If it is found that the surrounding region exhibits a certain type of motion, a non-zero motion vector representative of that motion is generated and associated with the current macroblock. In particular, the continuity, velocity or deviation of motion in the surrounding macroblocks or sub-blocks can be analyzed. For example, if the motion in the surrounding region exhibits a certain level of continuity, a certain common velocity, or a particular form of divergence, a motion vector representative of that motion can be assigned to the current macroblock to be coded. On the other hand, if the region surrounding the current macroblock does not exhibit such continuity, common velocity or divergence and has an insignificant level of motion, the macroblock to be coded is assigned a zero motion vector, causing it to be copied directly from the reference frame, just as if it were a conventional SKIP mode macroblock. In this way, according to the invention, SKIP mode macroblocks can adapt to the motion in the region surrounding them, enabling global or regional motion to taken account of in an efficient manner.

In an advantageous embodiment of the invention, the surrounding macroblocks or sub-blocks whose motion is analysed are previously encoded macroblocks neighboring the macroblock to be coded. This ensures that motion information relating to the region the surrounding a macroblock is available in the encoder (decoder) when a current macroblock is being encoded (decoded) and can be used directly to determine the motion vector to be assigned to the current macroblock. This approach enables the motion analysis of the surrounding region performed in the encoder to be duplicated exactly in the decoder. This, in turn, means that according to the invention, no additional information must be sent to the decoder in order to model global or regional motion.

As will become apparent from the detailed description of the invention presented below, redefinition of the skip mode concept as proposed by the present invention has significant technical advantages compared with the previously described prior art video coding methods. In particular, the method according to the invention enables global and regional motion within a video sequence to be taken account of in an efficient manner without the need for complex warping of the reference frame or any other computationally demanding operations. Furthermore, in contrast to both the global motion compensation and global motion vector coding methods previously described, no additional information must be transmitted in the video bit-stream to enable correct decoding of the video data. Additionally, a minimal amount of modification is required to incorporate the method according to the invention into existing video coding systems that employ the concept of skip mode macroblocks.

These and other features, aspects, and advantages of embodiments of the present invention will become apparent with reference to the following detailed description in conjunction with the accompanying drawings. It is to be understood, however, that the drawings are designed solely for the purposes of illustration and not as a definition of the limits of the invention.

BEST MODE FOR CARRYING OUT THE INVENTION

Exemplary embodiments of the invention will now be described in detail with particular reference to FIGS. 6 to 10.

According to the invention, skip (or SKIP) mode macroblocks in a video coding system adapt to the motion of surrounding image segments. If active motion is detected around a macroblock to be coded/decoded, motion parameters conforming to the motion are generated and the macroblock is motion compensated. In this way, no additional information needs to be transmitted from the encoder to the decoder.

Figure 1:
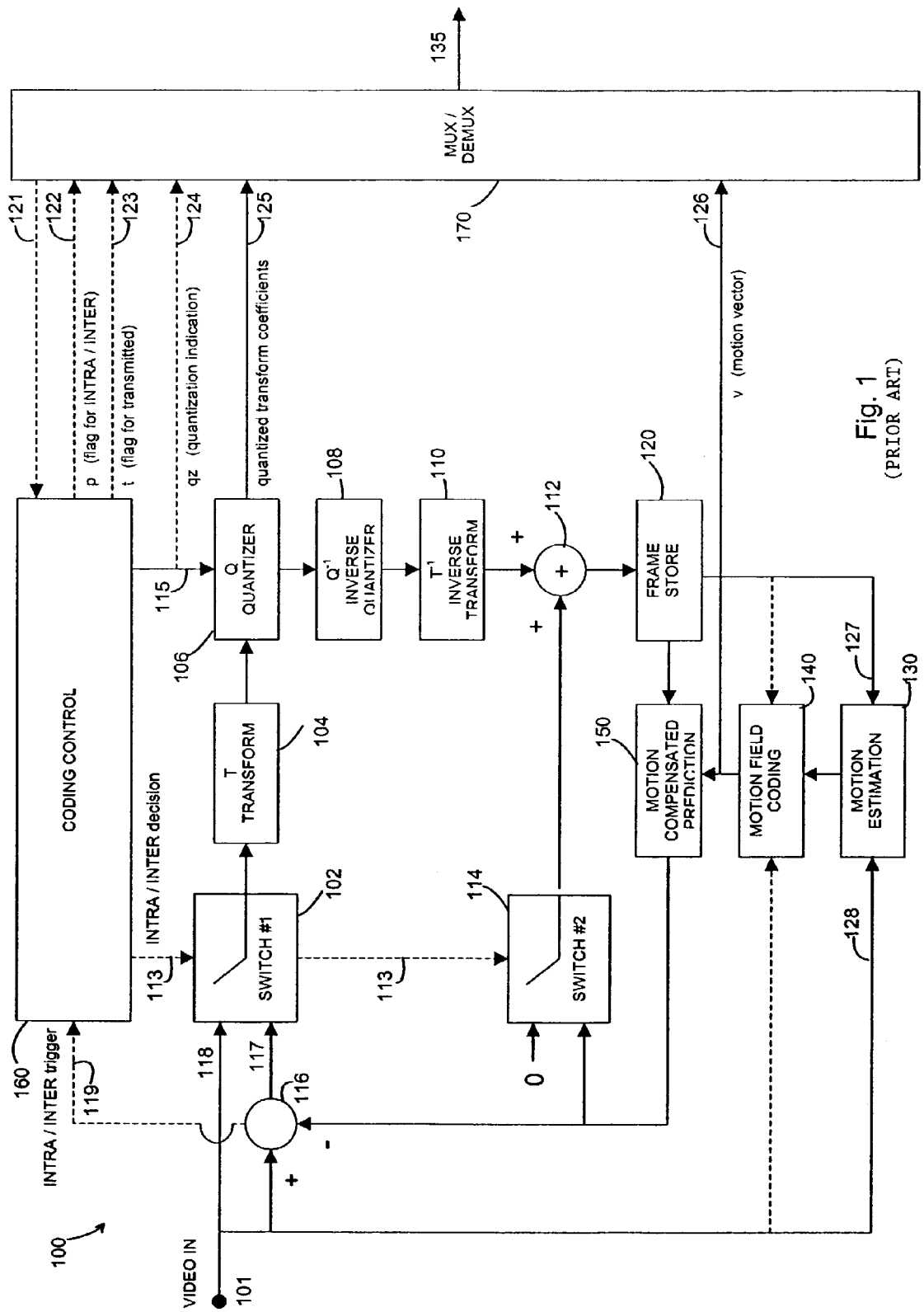
FIG. 1 is a schematic block diagram of a generic video encoder according to prior art.
Figure 6:
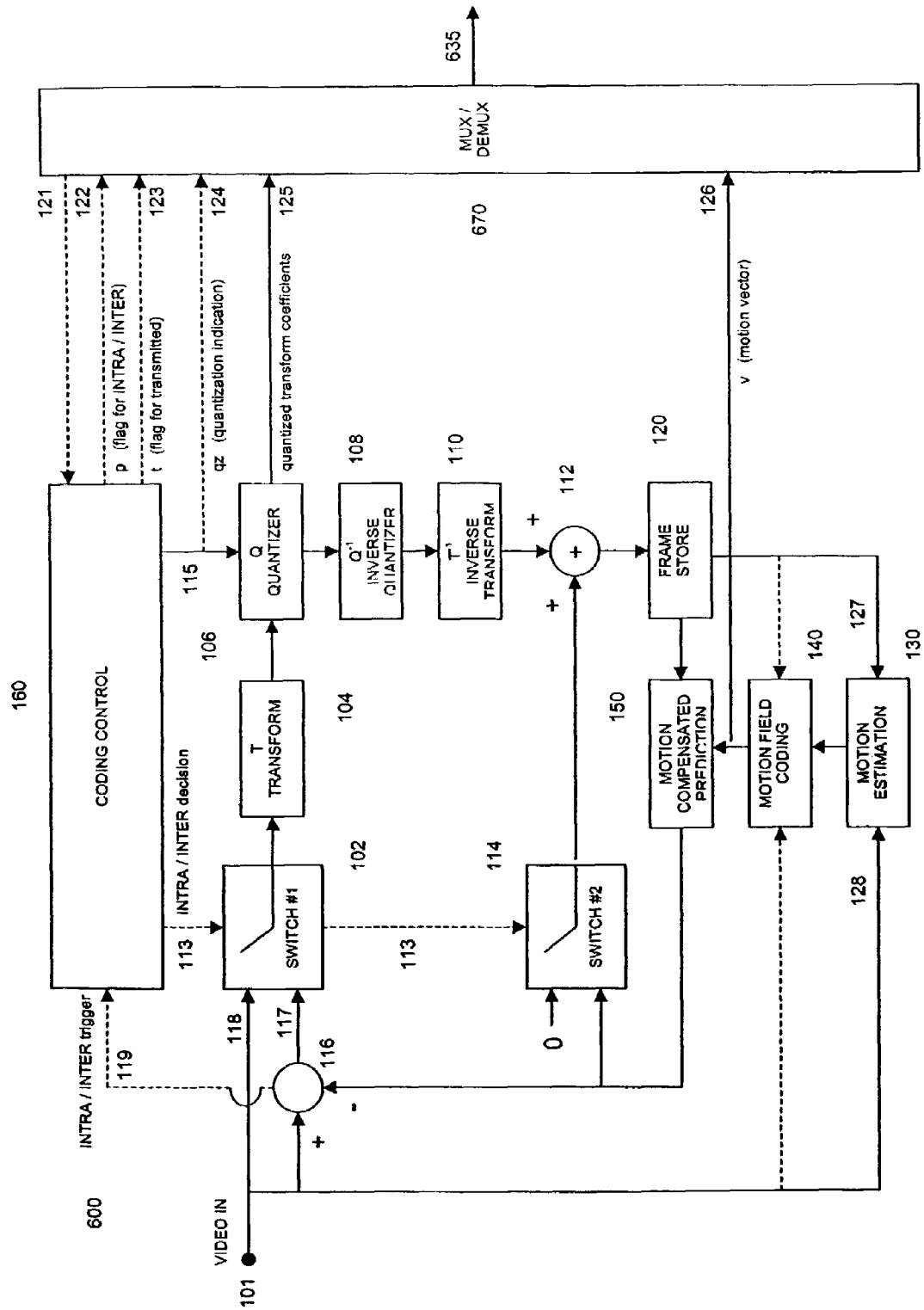
FIG. 6 is a schematic block diagram of a video encoder according to an embodiment of the invention.

FIG. 6 is a schematic block diagram of a video encoder 600 implemented according to an embodiment of the invention. When encoding frames of a digital video sequence, encoder 600 operates in a manner similar to that previously described in connection with the prior art video encoder of FIG. 1 to generate INTRA-coded and INTER-coded compressed video frames. The structure of the video encoder shown in FIG. 6 is substantially identical to that of the prior art video encoder shown in FIG. 1, with appropriate modifications to the motion estimation part necessary to implement the video encoding method according to the invention. All parts of the video encoder which implement functions and operate in a manner identical to the previously described prior art video encoder are identified with identical reference numbers.

As the present invention relates to the encoding of video frames in INTER-coded format and more particularly to details of the motion-compensated prediction performed as part of the INTER coding process, description of encoder 600 in INTRA-coding mode will be omitted and the following sections will concentrate on the operations performed by the encoder in INTER-coding mode.

In INTER-coding mode, the video encoder's control manager 160 operates switch 102 to receive its input from line 117, which comprises the output of combiner 116. The combiner 116 receives the video input signal macroblock by macroblock from input 101. As combiner 116 receives the blocks of luminance and chrominance values which make up the macroblock, it forms corresponding blocks of prediction error information, representing the difference between the block in question and its prediction, produced in motion compensated prediction block 650.

The prediction error information for each block of the macroblock is passed to DCT transformation block 104, which performs a two-dimensional discrete cosine transform on each block of prediction error values to produce a two-dimensional array of DCT transform coefficients for each block. These are passed to quantizer 106 where they are quantized using a quantization parameter QP. Selection of the quantization parameter QP is controlled by the control manager 160 via control line 115.

The quantized DCT coefficients representing the prediction error information for each block of the macroblock are then passed from quantizer 106 to video multiplex coder 170, via line 125. The video multiplex coder 170 orders the transform coefficients for each prediction error block using a zigzag scanning procedure, represents each non-zero valued quantized coefficient as a run-level pair and compresses the run-level pairs using entropy coding. Video multiplex coder 170 also receives motion vector information from motion field coding block 640 via line 126 and control information from control manager 160. It entropy codes the motion vector information and control information and forms a single bit-stream of coded image information, 135 comprising the entropy coded motion vector, prediction error and control information.

The quantized DCT coefficients representing the prediction error information for each block of the macroblock are also passed from quantizer 106 to inverse quantizer 108. Here they are inverse quantized and the resulting blocks of inverse quantized DCT coefficients are applied to inverse DCT transform block 110, where they undergo inverse DCT transformation to produce locally decoded blocks of prediction error values. The locally decoded blocks of prediction error values are then input to combiner 112. In INTER-coding mode, switch 114 is set so that the combiner 112 also receives predicted pixel values for each block of the macroblock, generated by motion-compensated prediction block 650. The combiner 112 combines each of the locally decoded blocks of prediction error values with a corresponding block of predicted pixel values to produce reconstructed image blocks and stores them in frame store 120.

As subsequent macroblocks of the video signal are received from the video source and undergo the previously described encoding and decoding steps in blocks 104, 106, 108, 110, 112, a decoded version of the frame is built up in frame store 120. When the last macroblock of the frame has been processed, the frame store 120 contains a completely decoded frame, available for use as a motion prediction reference frame in encoding a subsequently received video frame in INTER-coded format.

The details of the motion-compensated prediction performed by video encoder 600 will now be described in detail.

Encoder 600 performs motion-compensated prediction in a manner similar to the previously described JVT codec. In other words, it is adapted to assign a coding mode to each INTER-coded macroblock depending on the characteristics of the macroblock and the motion in the video sequence being coded. When examining which coding mode to assign to particular macroblock, motion estimation block 630 performs a motion estimation operation for each coding mode in turn. Motion estimation block 630 receives the blocks of luminance and chrominance values which make up the macroblock to be coded for use in motion estimation via line 128 (see FIG. 6). It then selects each of the possible coding modes one after the other, in turn, and performs motion estimation in order to identify a best match for the macroblock in the reference frame, on the basis of the selected coding mode and the pixel values of the macroblock to be coded. (The best match will comprise one or more best-matching regions of pixel values, depending on the coding mode). Each best-match is associated with an overall cost value, for example, a linear combination of the sum of absolute differences between the pixel values in the macroblock under examination and the best matching region in the reference frame, and an estimated number of bits required to code the mode and represent motion vectors. Once a best match has been obtained for each coding mode, motion estimation block 630 selects that coding mode which yields the smallest overall cost value as the coding mode for the current macroblock.

According to the invention, the coding modes used by encoder 600 correspond to those provided by JM1 of the JVT codec (shown in Table 3), with the exception that the SKIP mode is redefined to allow representation of global and regional motion. More specifically, the SKIP mode is modified in such a way that a zero (non-active) motion vector or a non-zero (active) motion vector is associated with each skip mode macroblock, depending on the characteristics of the motion in image segments surrounding the macroblock in question. In the following this type of motion vector will be referred to as a "skip mode motion vector".

When examining skip mode as part of the previously described motion estimation process performed in turn for each coding mode, the encoder first determines whether a zero or a non-zero skip mode motion vector should be used. To do this, the encoder is arranged to analyze the motion of image segments (e.g. macroblocks and/or sub-blocks) surrounding the macroblock to be coded. If it determines that the surrounding region exhibits a certain type of motion, for example it has characteristics indicative of global or regional motion, it generates a non-zero valued skip mode motion vector representative of the motion. On the other hand, if the encoder determines that the-region surrounding the current macroblock does not exhibit global or regional motion, but instead has an insignificant level of motion, it generates a zero valued skip mode motion vector. In other words, if the encoder determines that the motion in the region surrounding the current macroblock has a global characteristic, skip mode coding is adapted to take account of this (by generating an associated non-zero valued skip mode motion vector representative of the motion). Alternatively if no such motion is present, a zero valued motion vector is generated causing the skip mode as modified by the invention to operate in a conventional manner i.e. a zero valued skip mode motion vector causes a macroblock to be copied directly from the reference frame.

Having performed motion estimation operations for each of the available coding modes, including skip mode as modified according to the invention, encoder 600 determines which coding mode yields the smallest overall cost value and selects that mode as the coding mode for the macroblock in question. An indication of the finally selected coding mode, for example a variable length codeword selected from the set of codewords presented in Table 3, is associated with the macroblock and included in the video bit-stream 635. This enables a corresponding decoder to identify the coding mode for the macroblock and correctly reconstruct the macroblock using the correct form of motion-compensated prediction.

Figure 8:
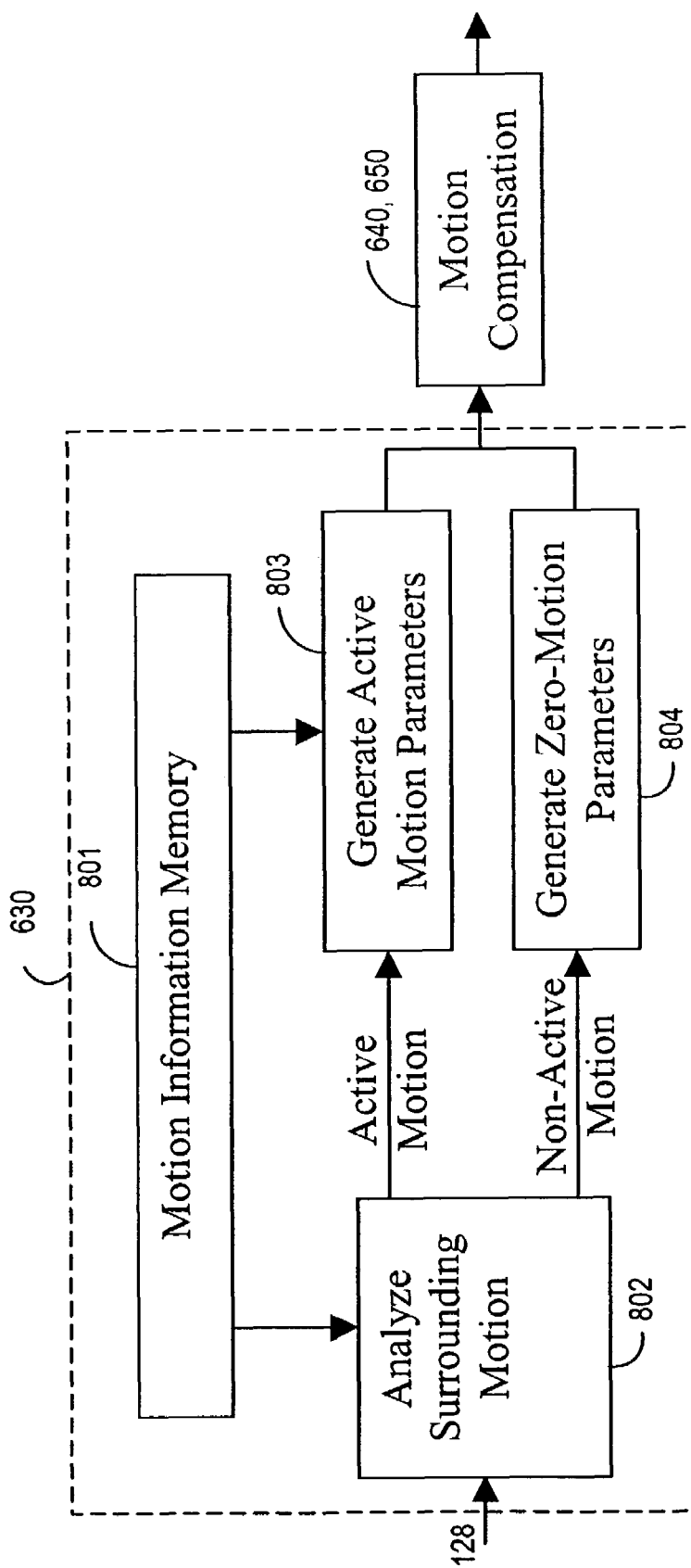
FIG. 8 illustrates encoding and decoding blocks for skip mode macroblocks in an encoder or decoder according an embodiment of the invention.

The analysis of motion in a region surrounding a macroblock to be coded to determine whether a zero valued or non-zero valued skip mode motion vector should be used will now be considered in further detail with reference to FIG. 8 of the accompanying drawings. FIG. 8 illustrates the functional elements of the motion estimation block 630 associated with generating skip mode motion vectors. These include motion information memory 801, surrounding motion analysis block 802, active motion parameter generation block 803 and zero motion parameter generation block 804.

Figure 9:
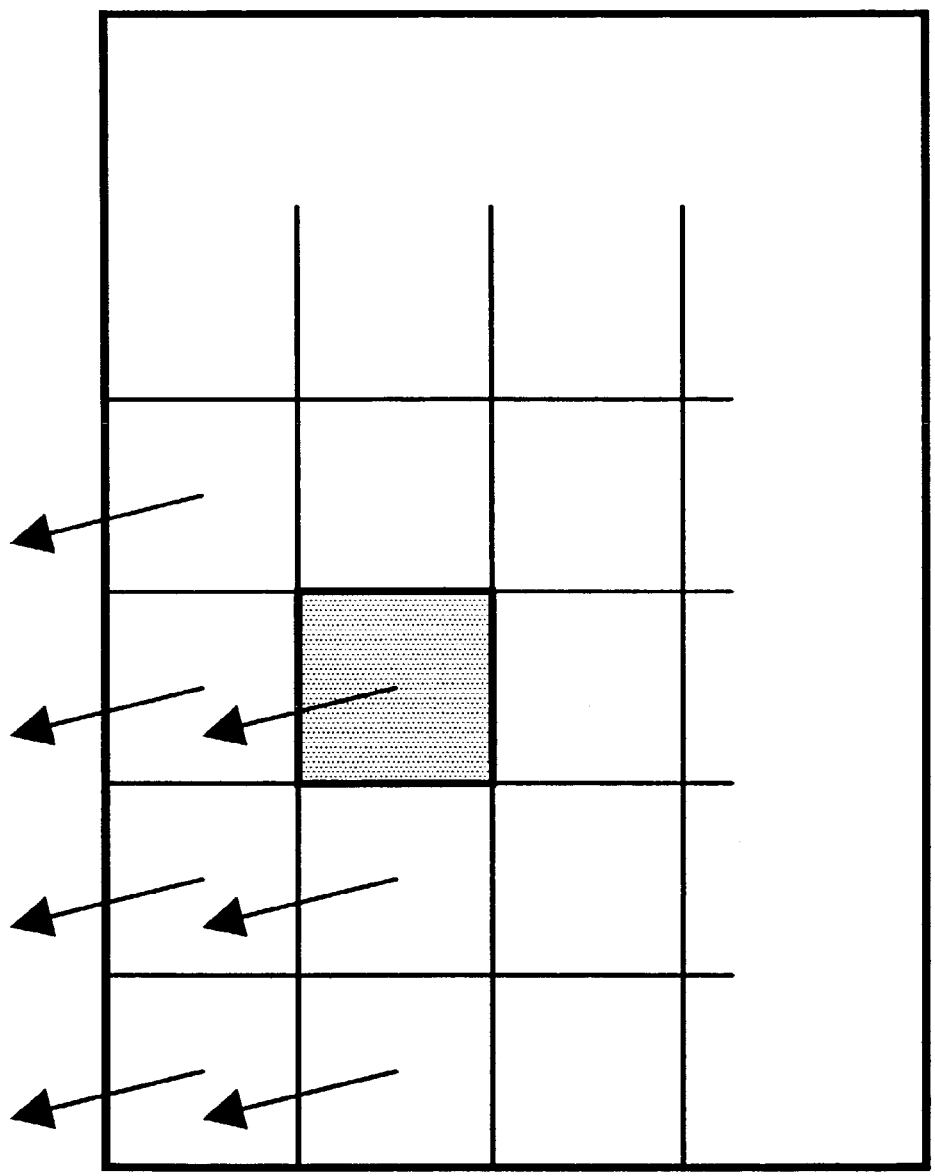
FIG. 9 shows an example of macroblock partitioning, motion in macroblocks surrounding a macroblock to be coded or decoded, and the generated skip mode motion vector for the macroblock (the darkened macroblock in the figure) according to an embodiment of the invention.

The decision whether to generate a zero valued skip mode motion vector or a non-zero valued skip mode motion vector is made by surrounding motion analysis block 802. The decision is made by analysing and classifying the motion of macroblocks or sub-blocks in a predefined region surrounding the macroblock to be coded using a predetermined analysis scheme. In order to perform the analysis, surrounding motion analysis block 802 retrieves motion information relating to the macroblocks and/or sub-blocks in the surrounding region from motion information memory 801. Depending on the specific details of the implementation, surrounding motion analysis block may be arranged to analyze the continuity, velocity or deviation of motion in the surrounding macroblocks or sub-blocks. For example, if the motion in the surrounding region exhibits a certain level of continuity, a certain common velocity (as depicted in FIG. 9, for example), or a particular form of divergence, this may suggest that some form of global or regional motion is present. As a consequence surrounding motion analysis block concludes that "active motion" is present in the surrounding region and a non-zero valued skip mode motion vector should be used. On the other hand, if the region surrounding the current macroblock does not exhibit such continuity, common velocity or divergence and has a generally insignificant level of motion, the surrounding motion analysis block concludes that "non-active motion" is present in the surrounding region and consequently a zero valued skip mode motion vector should be used.

As shown in FIG. 8, if the surrounding motion analysis block determines that "active motion" is present in the surrounding region, it sends an indication to that effect to active motion parameter generation block 803, which forms a non-zero valued skip mode motion vector representative of the motion in the surrounding region. To do this active motion parameter generation block 803 retrieves motion information relating to the surrounding macroblocks and/or sub-blocks from motion information memory 801. Alternatively, this information may be passed to the active motion parameter generation block by surrounding motion analysis block 802. If surrounding motion analysis block determines that "non-active motion" is present in the surrounding region, it sends a corresponding indication to zero motion parameter generation block 804, which forms a zero valued skip mode motion vector.

In a particularly advantageous embodiment of the invention, the surrounding region of macroblocks or sub-blocks analyzed by the surrounding motion analysis block comprises previously encoded macroblocks neighboring the macroblock to be coded (FIG. 9). In this case, the analysis and classification of motion in the surrounding region performed in the encoder can be duplicated exactly in the decoder. This, in turn, means that according to the invention, no additional information must be sent to the decoder in order to model global or regional motion.

In an alternative embodiment of the invention the coding modes of already coded macroblocks are taken into account when deciding whether to use a zero valued or non-zero valued skip mode motion vector. For example, if the surrounding motion analysis block determines that there is one or more stationary neighboring macroblock, a zero valued skip mode motion vector is used.

In a first preferred embodiment of the invention surrounding motion analysis block 802 classifies the motion in the region surrounding the macroblock according to the following three step procedure. Firstly, surrounding motion analysis block retrieves motion information for the macroblocks or sub-blocks surrounding the macroblock to be coded (i.e. previously encoded macroblocks neighboring the macroblock to be coded, as shown in FIG. 9) and generates a median motion vector prediction for the macroblock. The median motion vector prediction is formed, for example, in a manner analogous to that used in motion vector prediction according to JM1 of the JVT codec (see T. Weigland: "Joint Model Number 1", Doc. JVT-A003, Joint Video Team of ISO/IEC MPEG and ITU-T VCEG, January 2002). Next surrounding motion analysis block determines if any of the resulting motion vector components has an absolute value larger than a certain threshold value (for example half a pixel). If this condition is fulfilled, the motion is classified as "active motion", otherwise it is classified as "non-active motion". Finally, depending on the classification result, surrounding motion analysis block 802, sends an indication to either the active motion parameter generation block 803 or the zero motion parameter generation block 804 to in order to generate the appropriate skip mode motion parameters.

Implementation of the surrounding motion analysis block according to the first preferred embodiment of the invention is particularly advantageous for two reasons. Firstly, in a typical video codec, such as the JVT codec, a median predictor is used to predict motion vectors of square image blocks. According to the first preferred embodiment, this same predictor is used in the surrounding motion analysis block and active motion parameter generation block to analyze motion in the region surrounding a macroblock to be coded and to generate motion parameters for SKIP mode macroblocks. In this way the invention can be implemented with minimal effect on the total implementation complexity of the video codec. Secondly, because the surrounding motion analysis block 802 classifies the motion in the surrounding region by generating and analyzing a median motion vector, active motion parameter generation block 803 can simply pass the median motion parameters, already generated in the surrounding motion analysis block, to the motion compensation block. This also minimizes the implementation complexity, since there is no need to generate additional motion parameters.

In a second preferred embodiment of the invention the surrounding motion analysis block analyses the motion in vicinity of the macroblock to be coded and classifies it as either "active motion" or "non-active motion". In the case of "active motion" the active motion parameter generation block is activated and in the case of "non-active motion" the zero motion parameter generation block is activated. In this embodiment the classification to the "non-active motion" category takes place if either or both of the two conditions below are true, otherwise the motion is classified as "active motion":

Condition 1: The macroblock immediately above or the macroblock immediately to the left of the macroblock under consideration is not available (that is, is out of the picture or belongs to a different slice).

Condition 2: The macroblock or block immediately above, or the macroblock or block immediately to the left that are used in motion vector prediction for the 16×16 INTER mode has a zero motion vector and uses the latest picture as reference in motion compensation.

Figure 2:
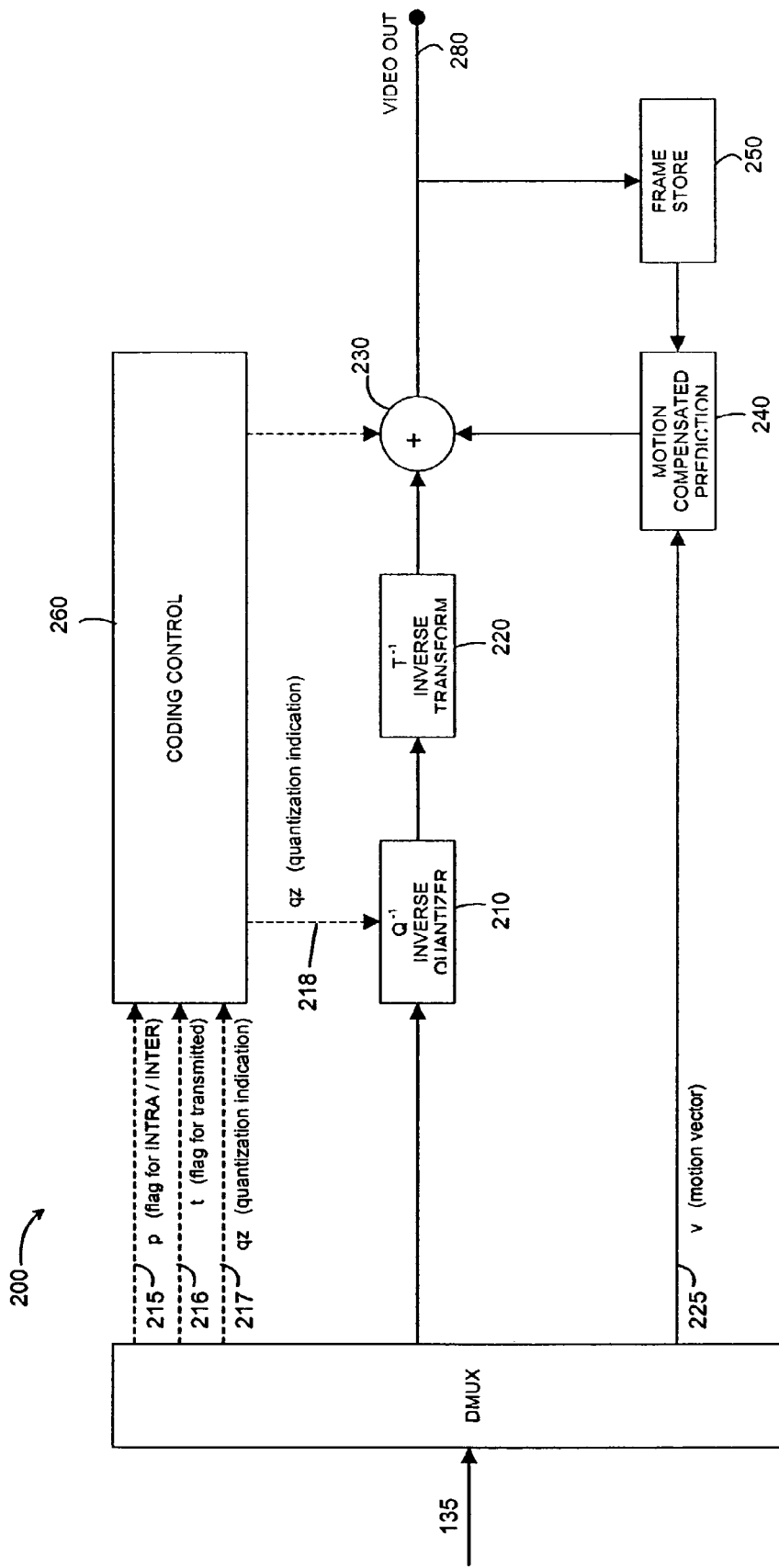
FIG. 2 is a schematic block diagram of a generic video decoder according to prior art and corresponding to the encoder shown in FIG. 1.
Figure 3:
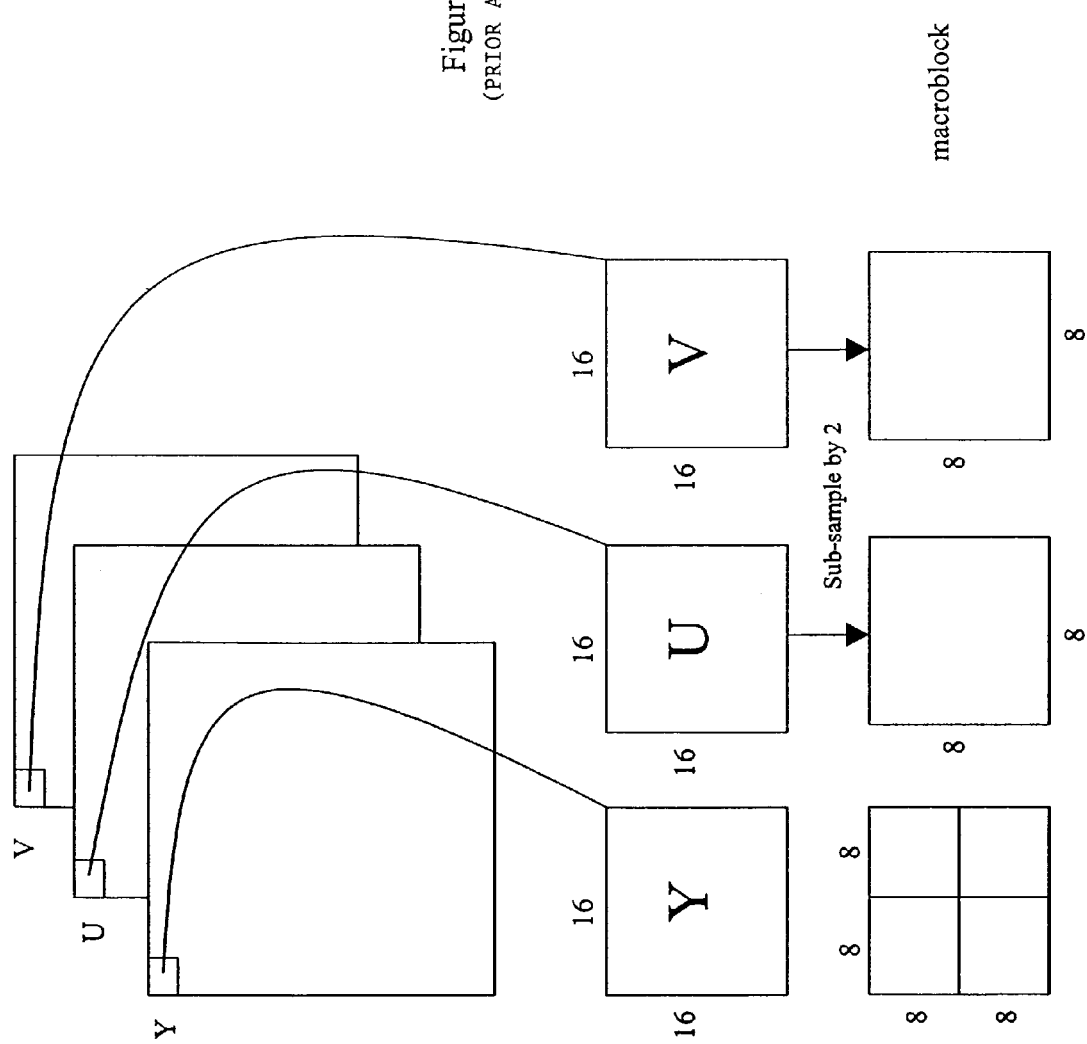
FIG. 3 illustrates the formation of a macroblock according to prior art.
Figure 4:
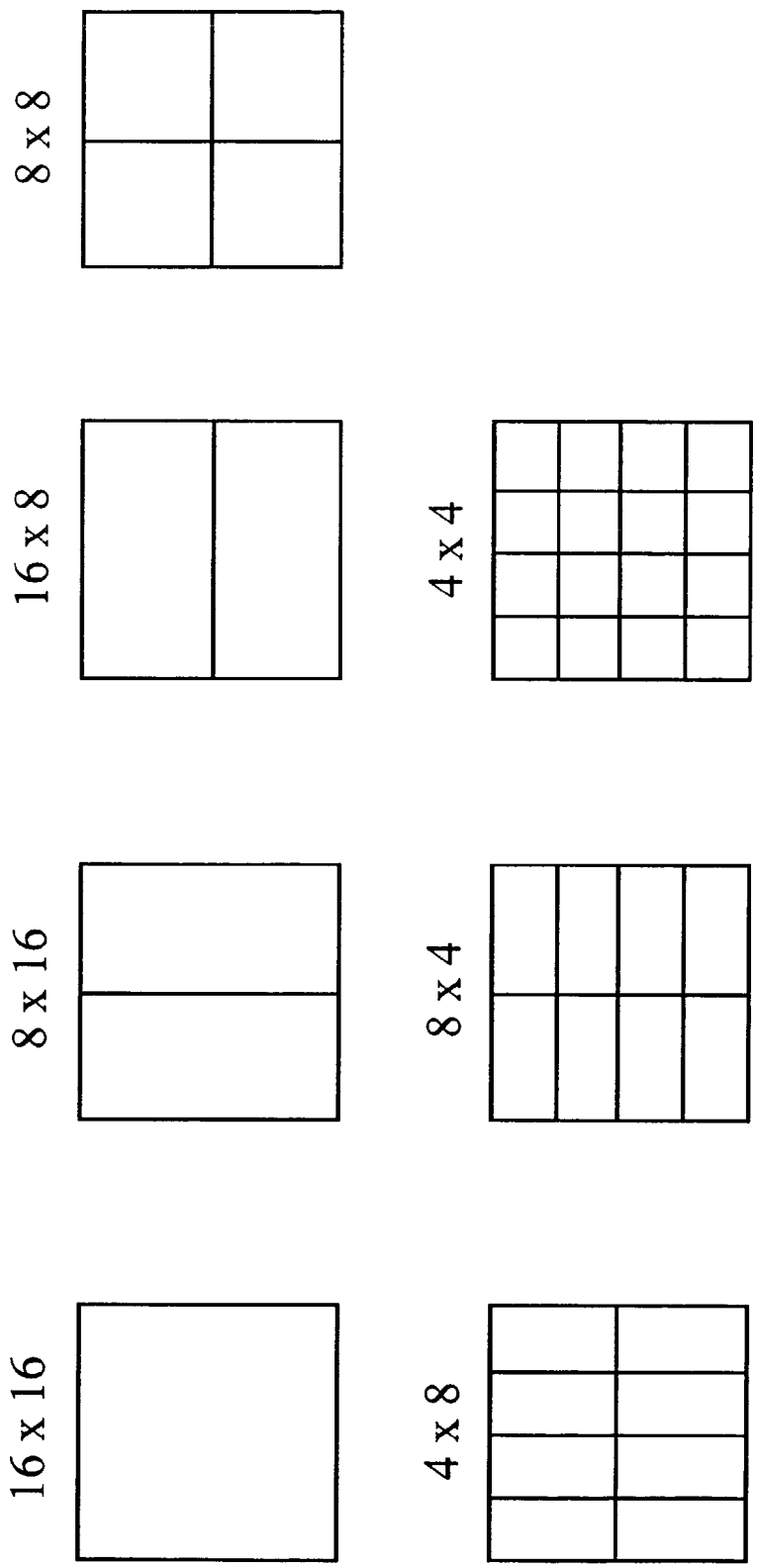
FIG. 4 shows the 7 possible divisions of macroblocks into blocks according to JM1 of the JVT video codec.
Figure 5:
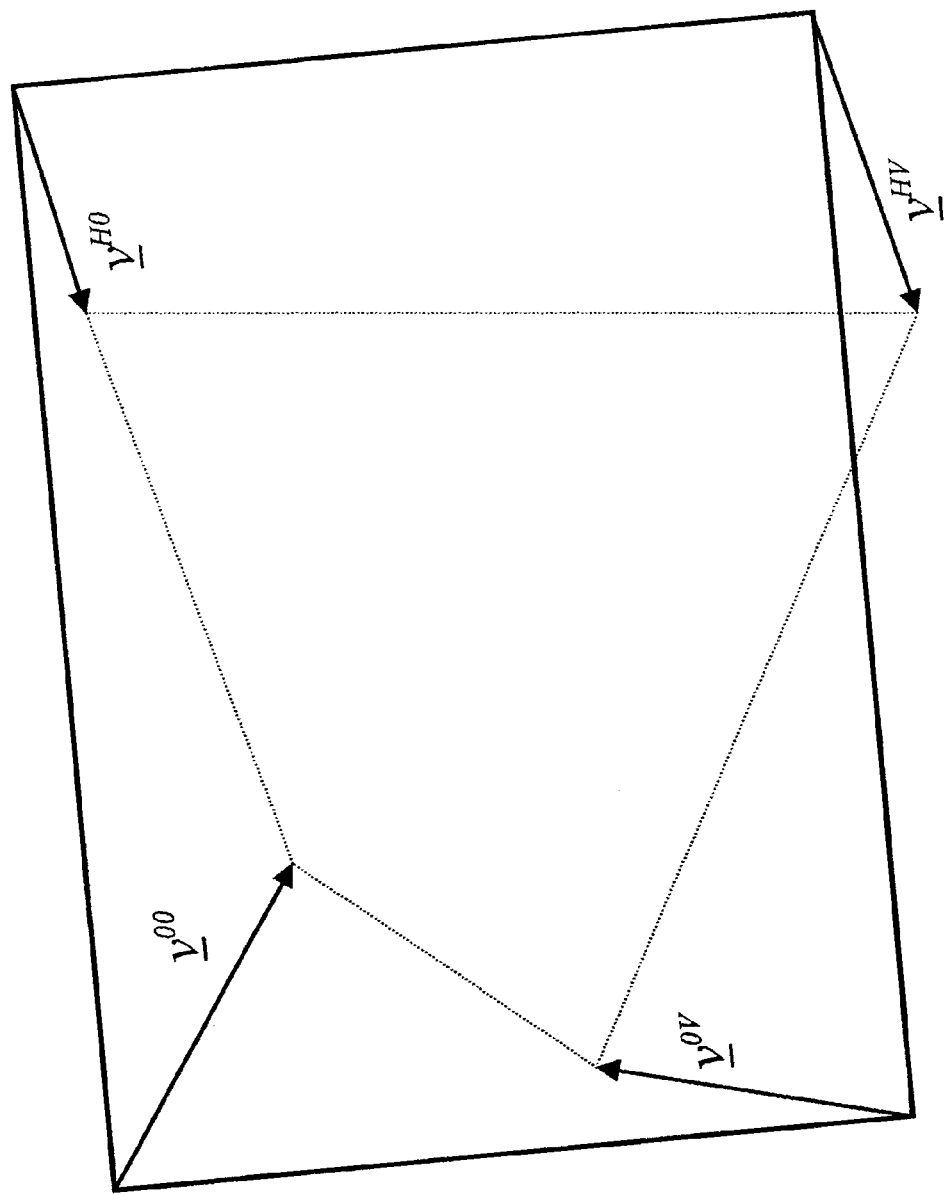
FIG. 5 illustrates the generation of conceptual motion vectors for mapping the corners of a current picture to those of a reference picture in the global motion compensation scheme according to H.263 Annex P.
Figure 7:
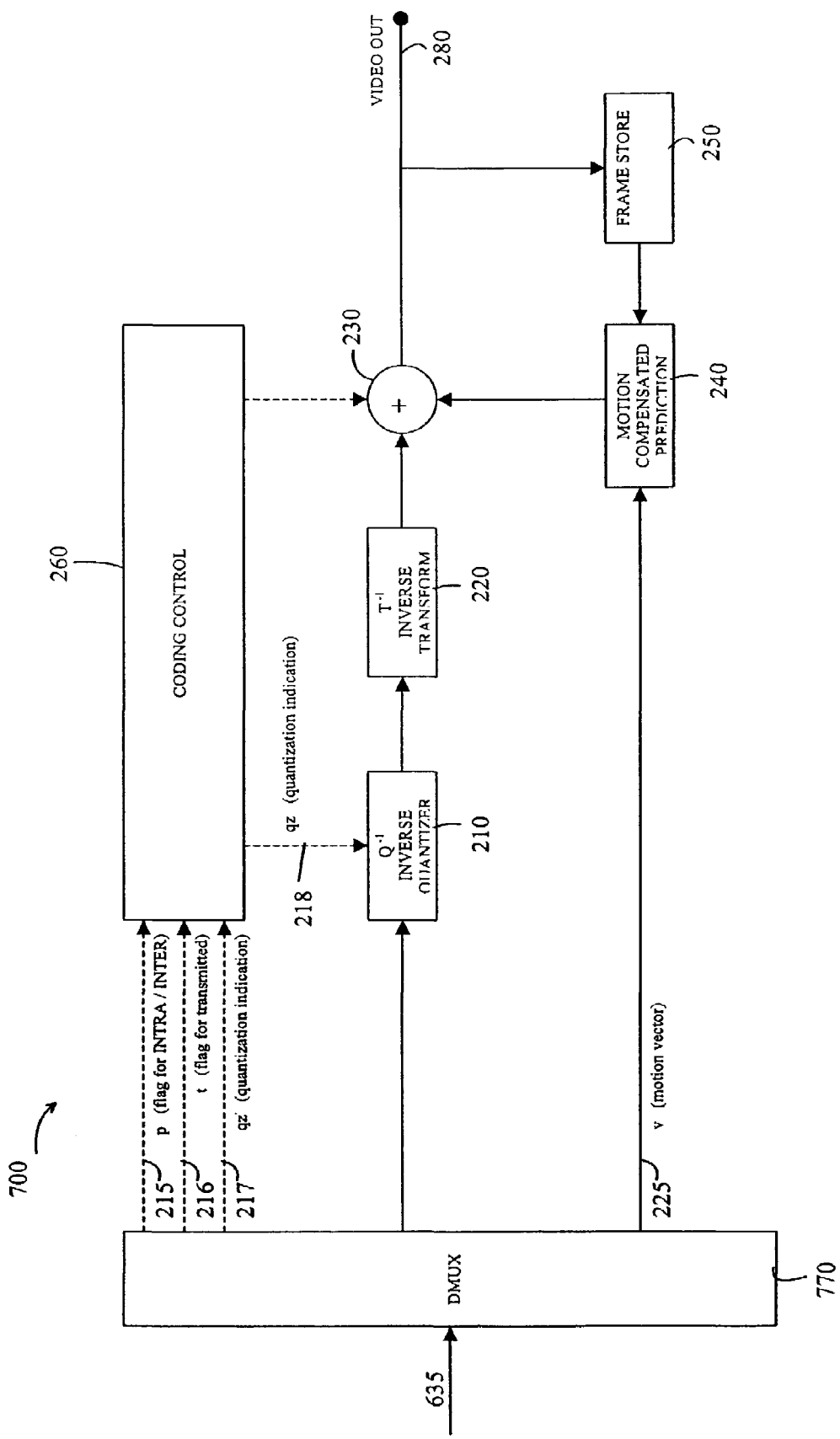
FIG. 7 is a schematic block diagram of a video decoder according to an embodiment of the invention and corresponding to the encoder shown in FIG. 6.

Operation of a video decoder 700 according to an embodiment of the invention will now be described with reference to FIG. 7. The structure of the video decoder illustrated in FIG. 7 is substantially identical to that of the prior art video decoder shown in FIG. 2, with appropriate modifications to those parts of the decoder that perform motion estimation operations. All parts of the video decoder which implement functions and operate in a manner identical to the previously described prior art video decoder are identified with identical reference numbers. It is further assumed that the video decoder of FIG. 7 corresponds to the encoder described in connection with FIG. 6 and is therefore capable of receiving and decoding the bit-stream 635 transmitted by encoder 600. Furthermore, as the present invention affects the decoding of video frames in INTER-coded format, description of the operations performed by decoder 700 in connection with the decoding of INTRA-coded frames will be omitted.

INTER-coded frames are decoded macroblock by macroblock, each INTER-coded macroblock being decoded substantially as soon as encoded information relating to it is received in the bit-stream 635. Depending on the coding mode, the compressed video data included in the bit-stream for an INTER-coded macroblock may comprise a combination of VLC encoded prediction error information for each block, motion vector information for the macroblock (or sub-blocks) and encoded control information including an indication of the coding mode used to encode the macroblock in question. If a macroblock is encoded in skip mode, no prediction error or motion vector information relating to the macroblock is included in the bit-stream.

Video multiplex decoder 270 receives the video bit-stream 635 and separates control information, including an indication of the coding mode of the macroblock from any encoded prediction error and/or motion vector information that may be present.

As explained earlier, prediction error information is encoded as variable length codewords representative of entropy coded level and run values. If prediction error information is provided for the current macroblock, the video multiplex decoder 270 recovers the level and run values by decoding the variable length codewords using a variable length decoding method corresponding to the encoding method used in encoder 600. It then reconstructs an array of quantized DCT transform coefficient values for each prediction error block and passes them to inverse quantizer 210 where they are inverse quantized. The inverse quantized DCT coefficients are then inverse transformed in the inverse DCT transformer 220 to yield an array of reconstructed prediction error values for each block of the macroblock.

Both the coding mode indication and encoded motion vector information (if any) associated with the macroblock are decoded in the video multiplex decoder and are passed via control line 225 to motion compensated prediction block 740. Motion compensated prediction block 740 uses the coding mode indication and motion vector information (if any) to form a prediction for the macroblock in question. More specifically, the motion compensated prediction block 740 forms an array of pixel values for each block of the macroblock by copying corresponding pixel values from a region (or regions) of pixels in a reference frame. The prediction, that is the blocks of pixel values derived from the reference frame, are passed from motion compensated prediction block 740 to combiner 230 where they are combined with the decoded prediction error information (if any). In this way an array of reconstructed pixel values for each block of the macroblock is obtained.

The reconstructed pixel values are passed to the video output 280 of the decoder and are also stored in frame store 250. Consequently, as subsequent macroblocks of the INTER-coded frame are decoded and stored, a decoded frame is progressively assembled in the frame store 250 and thus becomes available for use as a reference frame for motion-compensated prediction of other INTER-coded frames.

According to the invention, the motion compensated prediction block 740 of decoder 700 comprises a motion information memory block 801, a surrounding motion analysis block 802, an active motion parameter generation block 803 and a zero motion parameter generation block 804 analogous to those provided in encoder 600. These functional blocks are used to determine whether a macroblock encoded in skip mode should be associated with a zero valued or a non-zero valued skip mode motion vector. More specifically, when it is determined that a macroblock to be decoded was encoded in skip mode, surrounding motion analysis block 802 analyses and classifies the motion of previously decoded macroblocks and/or sub-blocks in a predefined region surrounding the macroblock to be decoded in a manner exactly corresponding to that used in encoder 600. As a result of the analysis, the macroblock in question is either associated with a non-zero valued skip mode motion vector or a zero valued skip mode motion vector. This motion vector is then used to form a prediction for the macroblock. If the macroblock is associated with a zero valued skip mode motion vector, it is reconstructed by simply copying pixel values from a corresponding location in the reference frame. If, on the other hand, it is associated with a non-zero valued motion vector, a region of pixel values indicated by the non-zero motion vector is used to generate the pixel values for the macroblock.

It should be appreciated that by modifying the skip mode concept in the manner proposed by the invention and performing surrounding motion analysis in the decoder, it is possible to take account of global or region motion in a video sequence without requiring explicit information about such motion to be provided in video bit-stream.

Figure 10:
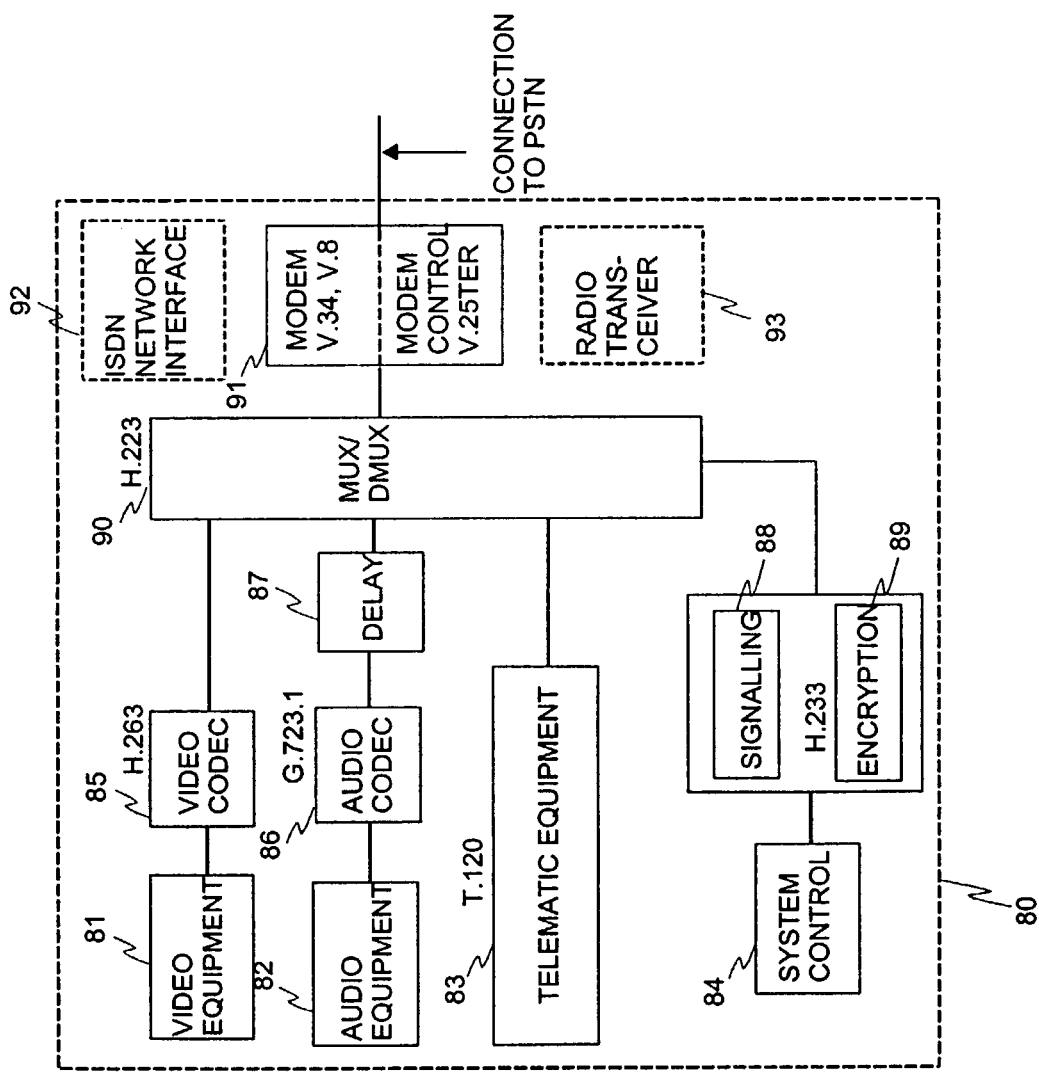
FIG. 10 is a schematic block diagram of a multimedia communications terminal in which the method according to the invention may be implemented.

A terminal device comprising video encoding and decoding equipment which may be adapted to operate in accordance with the present invention will now be described. FIG. 10 of the accompanying drawings illustrates a multimedia terminal 80 implemented according to ITU-T recommendation H.324. The terminal can be regarded as a multimedia transceiver device. It includes elements that capture, encode and multiplex multimedia data streams for transmission via a communications network, as well as elements that receive, de-multiplex, decode and display received multimedia content. ITU-T recommendation H.324 defines the overall operation of the terminal and refers to other recommendations that govern the operation of its various constituent parts. This kind of multimedia terminal can be used in real-time applications such as conversational videotelephony, or non real-time applications such as the retrieval and/or streaming of video clips, for example from a multimedia content server in the Internet.

In the context of the present invention, it should be appreciated that the H.324 terminal shown in FIG. 10 is only one of a number of alternative multimedia terminal implementations suited to application of the inventive method. It should also be noted that a number of alternatives exist relating to the location and implementation of the terminal equipment. As illustrated in FIG. 10, the multimedia terminal may be located in communications equipment connected to a fixed line telephone network such as an analogue PSTN (Public Switched Telephone Network). In this case the multimedia terminal is equipped with a modem 91, compliant with ITU-T recommendations V.8, V.34 and optionally V.8bis. Alternatively, the multimedia terminal may be connected to an external modem. The modem enables conversion of the multiplexed digital data and control signals produced by the multimedia terminal into an analogue form suitable for transmission over the PSTN. It further enables the multimedia terminal to receive data and control signals in analogue form from the PSTN and to convert them into a digital data stream that can be demultiplexed and processed in an appropriate manner by the terminal.

An H.324 multimedia terminal may also be implemented in such a way that it can be connected directly to a digital fixed line network, such as an ISDN (Integrated Services Digital Network). In this case the modem 91 is replaced with an ISDN user-network interface. In FIG. 10, this ISDN user-network interface is represented by alternative block 92.

H.324 multimedia terminals may also be adapted for use in mobile communication applications. If used with a wireless communication link, the modem 91 can be replaced with any appropriate wireless interface, as represented by alternative block 93 in FIG. 10. For example, an H.324/M multimedia terminal can include a radio transceiver enabling connection to the current $2^{nd}$ generation GSM mobile telephone network, or the proposed $3^{rd}$ generation UMTS (Universal Mobile Telephone System).

It should be noted that in multimedia terminals designed for two-way communication, that is for transmission and reception of video data, it is advantageous to provide both a video encoder and video decoder implemented according to the present invention. Such an encoder and decoder pair is often implemented as a single combined functional unit, referred to as a "codec".

A typical H.324 multimedia terminal will now be described in further detail with reference to FIG. 10.

The multimedia terminal 80 includes a variety of elements referred to as "terminal equipment". This includes video, audio and telematic devices, denoted generically by reference numbers 81, 82 and 83, respectively. The video equipment 81 may include, for example, a video camera for capturing video images, a monitor for displaying received video content and optional video processing equipment. The audio equipment 82 typically includes a microphone, for example for capturing spoken messages, and a loudspeaker for reproducing received audio content. The audio equipment may also include additional audio processing units. The telematic equipment 83, may include a data terminal, keyboard, electronic whiteboard or a still image transceiver, such as a fax unit.

The video equipment 81 is coupled to a video codec 85. The video codec 85 comprises a video encoder and a corresponding video decoder, both implemented according to the invention. Such an encoder and a decoder will be described in the following. The video codec 85 is responsible for encoding captured video data in an appropriate form for further transmission over a communications link and decoding compressed video content received from the communications network. In the example illustrated in FIG. 10, the video codec is implemented according to JM1 of the JVT codec, with appropriate modifications to implement the modified SKIP mode concept according to the invention in both the encoder and the decoder of the video codec.

The terminal's audio equipment is coupled to an audio codec, denoted in FIG. 10 by reference number 86. Like the video codec, the audio codec comprises an encoder/decoder pair. It converts audio data captured by the terminal's audio equipment into a form suitable for transmission over the communications link and transforms encoded audio data received from the network back into a form suitable for reproduction, for example on the terminal's loudspeaker. The output of the audio codec is passed to a delay block 87. This compensates for the delays introduced by the video coding process and thus ensures synchronisation of audio and video content.

The system control block 84 of the multimedia terminal controls end-to-network signalling using an appropriate control protocol (signalling block 88) to establish a common mode of operation between a transmitting and a receiving terminal. The signalling block 88 exchanges information about the encoding and decoding capabilities of the transmitting and receiving terminals and can be used to enable the various coding modes of the video encoder. The system control block 84 also controls the use of data encryption. Information regarding the type of encryption to be used in data transmission is passed from encryption block 89 to the multiplexer/demultiplexer (MUX/DMUX unit) 90.

During data transmission from the multimedia terminal, the MUX/DMUX unit 90 combines encoded and synchronised video and audio streams with data input from the telematic equipment 83 and possible control data, to form a single bit-stream. Information concerning the type of data encryption (if any) to be applied to the bit-stream, provided by encryption block 89, is used to select an encryption mode. Correspondingly, when a multiplexed and possibly encrypted multimedia bit-stream is being received, MUX/DMUX unit 90 is responsible for decrypting the bit-stream, dividing it into its constituent multimedia components and passing those components to the appropriate codec(s) and/or terminal equipment for decoding and reproduction.

If the multimedia terminal 80 is a mobile terminal, that is, if it is equipped with a radio transceiver 93, it will be understood by those skilled in the art that it may also comprise additional elements. In one embodiment it comprises a user interface having a display and a keyboard, which enables operation of the multimedia terminal 80 by a user, a central processing unit, such as a microprocessor, which controls the blocks responsible for different functions of the multimedia terminal, a random access memory RAM, a read only memory ROM, and a digital camera. The microprocessor's operating instructions, that is program code corresponding to the basic functions of the multimedia terminal 80, is stored in the read-only memory ROM and can be executed as required by the microprocessor, for example under control of the user. In accordance with the program code, the microprocessor uses the radio transceiver 93 to form a connection with a mobile communication network, enabling the multimedia terminal 80 to transmit information to and receive information from the mobile communication network over a radio path.

The microprocessor monitors the state of the user interface and controls the digital camera. In response to a user command, the microprocessor instructs the camera to record digital images into the RAM. Once an image or digital video sequence is captured, or alternatively during the capturing process, the microprocessor segments the image into image segments (for example macroblocks) and uses the encoder to perform motion compensated encoding of the segments in order to generate a compressed image sequence, as explained in the foregoing description. A user may command the multimedia terminal 80 to display the captured images on its display or to send the compressed video sequence using the radio transceiver 93 to another multimedia terminal, a video telephone connected to a fixed line network (PSTN) or some other telecommunications device. In a preferred embodiment, transmission of image data is started as soon as the first segment is encoded so that the recipient can start a corresponding decoding process with a minimum delay.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes may be made therein without departing from the scope and spirit of the invention as set forth above.

In particular, according to an alternative embodiment of the invention, surrounding motion analysis block 802 is adapted to classify the motion of a surrounding region into more than two motion classes. For example, one meaningful classification involving three classes of motion would be "continuous motion", "active motion" and "non-active motion". In this way special motion parameters for the typical case of continuous motion can be generated.

In another alternative embodiment of the invention, the surrounding motion analysis block is removed and active motion parameter generation block is activated for all the skip mode macroblocks.

According to a further alternative embodiment Instead of using the surrounding motion analysis block to indicate the classification information, the indication is provided by other means (for example as side information in macroblock, slice, picture or sequence levels).

In yet another alternative embodiment, the surrounding motion analysis block may be temporarily disabled or enabled with such means.

In another alternative implementation, the macroblock mode table is rehashed depending on the output of the surrounding motion analysis block to give higher priority to more likely modes. In a related embodiment, the macroblock mode table is completely regenerated depending on the output of the surrounding motion analysis block, for example, by removing the skip.

It should also be appreciated that active motion parameters generation block 803 can be implemented in various ways. In particular embodiments of the invention it is adapted to generate the motion parameters, for example, based on the continuance, velocity or deviation of the surrounding motion. Additional side information can also be sent to guide the generation of motion parameters. In an alternative embodiment the active motion parameter generation block is adapted to output multiple motion vectors to be used in different parts of the macroblock.

The invention can also be used to generate motion compensated prediction for other Macroblock modes in addition to or instead of the SKIP mode. It is also not limited by the macroblock structure but can be used in any segmentation based video coding system.

What is claimed is:

1. A method of encoding a video sequence, the method comprising:
    assigning a skip coding mode to a first segment of a first frame of the sequence;
    assigning either a zero motion vector or a predicted non-zero motion vector for the skip coding mode for the first segment based at least in part on the motion information of a second segment neighboring the first segment; and
    forming a prediction for the first segment with respect to a reference frame based at least in part on the assigned motion vector for the skip coding mode, wherein the assigned motion vector is one of the zero motion vector and the predicted non-zero motion vector; and
    providing in an encoded bitstream an indication of the skip coding mode, wherein no further motion vector information for the first segment is coded in the encoded bitstream.

2. A method according to claim 1, wherein the second segment is a previously encoded segment neighboring the first segment.

3. A method according to claim 1, wherein if the motion in the second segment has an insignificant level of motion, the zero motion vector is assigned to the skip coding mode for the first segment and the prediction for the first segment is formed with respect to a corresponding segment of the reference frame associated with the zero motion vector.

4. A method according to claim 1, wherein if the motion in the second segment has a motion characteristic of a global or a regional motion,
    the method further comprising:
        deriving the predicted non-zero motion vector based at least in part on the motion vector of the second segment; and
    the predicted non-zero motion vector is assigned to the skip coding mode of the first segment and the prediction for the first segment is formed by a motion compensated prediction with respect to the reference frame based at least in part on the predicted non-zero motion vector.

5. A method according to claim 1, further comprising:
    performing an analysis of motion of a region surrounding the first segment;
    if it is determined that the region surrounding the first segment has at least one of the following types of motion: continuous motion, motion having a common velocity, and motion having a certain deviation,
        the method further comprising deriving the predicted non-zero motion vector based at least in part on the motion vector of the second segment; and
        the predicted non-zero motion vector is assigned for the skip coding mode of the first segment, and the prediction for the first segment is formed by a motion compensated prediction with respect to the reference frame based at least in part on the predicted non-zero motion vector; and
    otherwise, the zero motion vector is assigned for the skip coding mode of the first segment, and the prediction for the first segment is formed with respect to a corresponding segment of the reference frame associated with the zero motion vector.

6. A method according to claim 1, wherein if the second segment has zero motion vector, the zero motion vector is assigned for skip coding mode of the first segment and the prediction for the first segment is formed with respect to a corresponding segment of the reference frame associated with the zero motion vector.

7. A method of decoding an encoded video sequence, the method comprising:
    receiving an indication of a skip coding mode for a first segment;
    assigning either a zero motion vector or a predicted non-zero motion vector for the skip coding mode for the first segment based at least in part on the motion information of a second segment neighboring the first segment; and
    forming a prediction for the first segment with respect to a reference frame based at least in part on the assigned motion vector for the skip coding mode, wherein the assigned motion vector is one of the zero motion vector and the predicted non-zero motion vector.

8. A method according to claim 7, further comprising:
    performing an analysis of motion of a region surrounding the first segment;
    if it is determined that the region surrounding the first segment has at least one of the following types of motion: continuous motion, motion having a common velocity, and motion having a certain deviation,
        the method further comprising deriving the predicted non-zero motion vector based at least in part on the motion vector of the second segment; and
        the predicted non-zero motion vector is assigned for the skip coding mode of the first segment; and the prediction for the first segment is formed by a motion compensated prediction with respect to the reference frame based at least in part on the predicted non-zero motion vector; and
    otherwise, the zero motion vector is assigned for the skip coding mode of the first segment, and the prediction for the first segment is formed with respect to a corresponding segment of the reference frame associated with the zero motion vector.

9. A method according to claim 7, wherein if a segment in a previously decoded region surrounding the first segment has zero motion vector, the zero-motion vector is assigned to the skip coding mode of the first segment and the prediction for the first segment is formed with respect to a corresponding segment of the reference frame associated with the zero motion vector.

10. A video encoder for encoding a video sequence, the encoder comprises:
    a coding controller for assigning a skip coding mode to a first segment;
    a motion estimation block for
        assigning either a zero motion vector or a predicted non-zero motion vector for the skip coding mode for the first segment based at least in part on the motion information of a second segment neighboring the first segment; and
    forming a prediction for the first segment with respect to a reference frame based at least in part on the assigned motion vector for the skip coding mode, wherein the assigned motion vector is one of the zero motion vector and the predicted non-zero motion vector; and a multiplexer for providing in an encoded bitstream an indication of the skip coding mode, wherein no further motion vector information for the first segment is coded in the encoded bitstream.

11. An encoder according to claim 10, wherein the second segment is a previously encoded segment neighboring the first segment.

12. An encoder according to claim 10, wherein if the second segment has an insignificant level of motion, the motion estimation block is arranged to assign the zero motion vector for the skip coding mode of the first segment and the prediction for the first segment is formed with respect to a corresponding segment of the reference frame associated with the zero motion vector.

13. An encoder according to claim 10, wherein if the second segment has a motion characteristic of a global or a regional motion,
the motion estimation block is arranged to derive the predicted non-zero motion vector based at least in part on the motion vector of the second segment; and
the predicted non-zero motion vector is assigned to the skip coding mode of the first segment and the prediction for the first segment is formed by a motion compensated prediction with respect to the reference frame based at least in part on the predicted non-zero motion vector.

14. An encoder according to claim 10, wherein the motion estimation block is arranged to perform an analysis of motion of a region surrounding the first segment;
if it is determined that the region surrounding the first segment has at least one of the following types of motion: continuous motion, motion having a common velocity, and motion having a certain deviation
the motion estimation block is further arranged to derive a predicted non-zero motion vector based at least in part on the motion vector of the second segment; and
the predicted non-zero motion vector is assigned for the skip coding mode of the first segment, and the prediction for the first segment is formed by a motion compensated prediction with respect to the reference frame based at least in part on the predicted non-zero motion vector; and
otherwise, the zero motion vector is assigned for the skip coding mode of the first segment, and the prediction for the first segment is formed with respect to a corresponding segment of the reference frame associated with the zero motion vector.

15. An encoder according to claim 10, wherein if a segment in a region surrounding the first segment has zero motion vector, the encoder is arranged to assign the zero motion vector for the skip coding mode of the first segment and the prediction for the first segment is formed with respect to a corresponding segment of the reference frame associated with the zero motion vector.

16. A video decoder for decoding an encoded video sequence, the decoder comprising:
a demultiplexer for receiving an indication of a skip coding mode assigned to a first segment;
a motion compensated prediction block for
assigning either a zero motion vector or a predicted non-zero motion vector for the skip coding mode for the first segment based at least in part on the motion information of a second segment neighboring the first segment; and
forming a prediction for the first segment with respect to a reference frame based at least in part on the assigned motion vector for the skip coding mode, wherein the assigned motion vector is one of the zero motion vector and the predicted non-zero motion vector.

17. A decoder according to claim 16, wherein if the second segment has an insignificant level of motion, the decoder is arranged to assign the zero-motion vector to the skip coding mode for the first segment and the prediction for the first segment is formed with respect to a corresponding segment of the reference frame associated with the zero motion vector.

18. A decoder according to claim 16, wherein if the second segment has a motion characteristic of a global or a regional motion, the decoder is arranged to derive the predicted non-zero motion vector based at least in part on the motion vector of the second segment; and
the predicted non-zero motion vector is assigned to the skip coding mode of the first segment and the prediction for the first segment is formed by a motion compensated prediction with respect to the reference frame based at least in part on the predicted non-zero motion vector.

19. A decoder according to claim 16, wherein the motion compensated prediction block is configured to perform an analysis of motion of a region surrounding the first segment; and
if it is determined that the region surrounding the first segment has at least one of the following types of motion: continuous motion, motion having a common velocity, motion having a certain deviation,
the motion compensated prediction block further configured to derive a predicted non-zero motion vector based at least in part on the motion vector of the second segment; and
the predicted non-zero motion vector is assigned for the skip coding mode of the first segment, and the prediction for the first segment is formed by a motion compensated prediction with respect to the reference frame based at least in part on the predicted non-zero motion vector; and
otherwise, the zero motion vector is assigned for the skip coding mode of the first segment, and the prediction for the first segment is formed with respect to a corresponding segment of the reference frame associated with the zero motion vector.

20. A decoder according to claim 16, wherein if a segment in a region surrounding the first segment has zero motion vector, the zero motion vector is assigned for the skip coding mode of the first segment, and the prediction for the first segment is formed with respect to a corresponding segment of the reference frame associated with the zero motion vector.

21. A multimedia terminal, comprising an encoder according to claim 10.

22. A multimedia terminal comprising a decoder according to claim 16.

23. A method according to claim 1, wherein if the second segment has a non-zero motion vector,
the method further comprising deriving the predicted non-zero motion vector based at least in part on the motion vector of the second segment; and
the predicted non-zero motion vector is assigned for the skip coding mode of the first segment; and the prediction for the first segment is formed by a motion compensated prediction with respect to the reference frame based at least in part on the predicted non-zero motion vector.

24. A method according to claim 1, wherein if the second segment has a zero motion vector and the second segment is predicted using motion-compensated prediction from the reference picture, the zero motion vector is assigned to the skip coding mode of the first segment and the prediction for the first segment is formed with respect to a corresponding segment of the reference frame associated with the zero motion vector.

25. A method according to claim 1, wherein if the second segment has a zero motion vector and the second segment is predicted using motion-compensated prediction from a second reference picture immediately preceding the picture second segment belongs to, the zero motion vector is assigned to the skip coding mode of the first segment and the prediction for the first segment is formed with respect to a corresponding segment of the reference frame associated with the zero motion vector.

26. A method according to claim 1, further comprising:
performing an analysis of motion information of the second segment and motion information of a third segment neighboring the first segment; and
determining whether a region surrounding the first segment has a global or a regional motion in a video sequence based at least in part on a characteristic of the motion vector of the second segment and the motion vector of the third segment.

27. A method according to claim 26, wherein if the region surrounding the first segment has a global or a regional motion in a video sequence,
the method further comprising deriving the predicted non-zero motion vector based at least in part on the motion vector of the second segment and the motion vector of the third segment; and
the predicted non-zero motion vector is assigned for the skip coding mode of the first segment; and the prediction for the first segment is formed by a motion compensated prediction with respect to the reference frame based at least in part on the predicted non-zero motion vector.

28. A method according to claim 1, further comprising:
deriving the predicted non-zero motion vector based at least in part on the motion vector of the second segment.

29. A method according to claim 1, further comprising:
deriving the predicted non-zero motion vector based at least in part on the motion vector of the second segment and motion vector of a third segment neighboring the first segment.

30. A method according to claim 1, wherein no residual information is provided for the first segment in the encoded bitstream.

31. A method according to claim 1, further comprising:
deriving a predicted motion vector based at least in part on the motion vector of the second segment and motion vector of a third segment neighboring the first segment; and
if any component of the predicted motion vector has an absolute value larger than a certain threshold value, the predicted motion vector is assigned for the skip coding mode of the first segment, and the prediction for the first segment is formed by a motion compensated prediction with respect to the reference frame based at least in part on the predicted motion vector; and
if none of components of the predicted motion vector has an absolute value larger than the certain threshold value, the zero motion vector is assigned for the skip coding mode of the first segment, and the prediction for the first segment is formed with respect to a corresponding segment of the reference frame associated with the zero motion vector.

32. A method according to claim 7, wherein if the second segment has a zero motion vector, the zero motion vector is assigned to the skip coding mode of the first segment and the prediction for the first segment is formed with respect to a corresponding segment of the reference frame associated with the zero motion vector.

33. A method according to claim 7, wherein if the second segment has an insignificant level of motion, the zero motion vector is assigned to the skip coding mode of the first segment and the prediction for the first segment is formed with respect to a corresponding segment of the reference frame associated with the zero motion vector.

34. A method according to claim 7, wherein if the second segment has a non-zero motion vector,
the method further comprising deriving the predicted non-zero motion vector based at least in part on the motion vector of the second segment; and
the predicted non-zero motion vector is assigned for the skip coding mode of the first segment; and the prediction for the first segment is formed by a motion compensated prediction with respect to the reference frame based at least in part on the predicted non-zero motion vector.

35. A method according to claim 7, characterized in that if the second segment has a motion characteristic of a global or a regional motion,
the method further comprising deriving the predicted non-zero motion vector based at least in part on the motion vector of the second segment; and
the predicted non-zero motion vector is assigned to the skip coding mode of the first segment and the prediction for the first segment is formed by a motion compensated prediction with respect to the reference frame based at least in part on the predicted non-zero motion vector.

36. A method according to claim 7, wherein if the second segment has a zero motion vector and the second segment is predicted using motion-compensated prediction from the reference picture, the zero motion vector is assigned to the skip coding mode of the first segment and the prediction for the first segment is formed with respect to a corresponding segment of the reference frame associated with the zero motion vector.

37. A method according to claim 7, further comprising:
performing an analysis of motion information of the second segment and motion information of a third segment neighboring the first segment;
determining whether a region surrounding the first segment has a global or a regional motion in a video sequence based at least in part on a characteristic of the motion vector of the second segment and the motion vector of the third segment.

38. A method according to claim 37, wherein if the region surrounding the first segment has a global or a regional motion in a video sequence,
the method further comprising deriving the predicted non-zero motion vector based at least in part on the motion vector of the second segment and the motion vector of the third segment; and
the predicted non-zero motion vector is assigned for the skip coding mode of the first segment; and the prediction for the first segment is formed by a motion compensated prediction with respect to the reference frame based at least in part on the predicted non-zero motion vector.

39. A method according to claim 7, further comprising:
deriving the predicted non-zero motion vector based at least in part on the motion vector of the second segment.

40. A method according to claim 7, further comprising:
deriving the predicted non-zero motion vector based at least in part on the motion vector of the second segment and motion vector of a third segment neighboring the first segment.

41. A method according to claim 7, wherein no residual information is provided for the first segment in the encoded bitstream.

42. A method according to claim 7, further comprising:
deriving a predicted motion vector based at least in part on the motion vector of the second segment and motion vector of a third segment neighboring the first segment; and
if any component of the predicted motion vector has an absolute value larger than a certain threshold value, the predicted motion vector is assigned for the skip coding mode of the first segment, and the prediction for the first segment is formed by a motion compensated prediction with respect to the reference frame based at least in part on the predicted motion vector; and
if none of components of the predicted motion vector has an absolute value larger than the certain threshold value, the zero motion vector is assigned for the skip coding mode of the first segment, and the prediction for the first segment is formed with respect to a corresponding segment of the reference frame associated with the zero motion vector.

43. A method according to claim 1, wherein if the second segment has a zero motion vector and the second segment is predicted using motion-compensated prediction from a second reference picture immediately preceding the picture second segment belongs to, the zero motion vector is assigned to the skip coding mode of the first segment and the prediction for the first segment is formed with respect to a corresponding segment of the reference frame associated with the zero motion vector.

44. An encoder according to claim 10, wherein if the second segment has a non-zero motion vector,
the motion estimation block is further arranged to derive the predicted non-zero motion vector based at least in part on the motion vector of the second segment; and
the predicted non-zero motion vector is assigned for the skip coding mode for the first segment; and the prediction for the first segment is formed by a motion compensated prediction with respect to the reference frame based at least in part on the predicted non-zero motion vector.

45. An encoder according to claim 10, further wherein the motion estimation block is further arranged to:
perform an analysis of motion information of the second segment and motion information of a third segment neighboring the first segment;
determine whether a region surrounding the first segment has a global or a regional motion in a video sequence based at least in part on a characteristic of the motion vector of the second segment and the motion vector of the third segment.

46. An encoder according to claim 45, wherein if the region surrounding the first segment has a global or a regional motion in a video sequence,
the motion estimation block further arranged to derive the predicted non-zero motion vector based at least in part on the motion vector of the second segment and the motion vector of the third segment; and
the predicted non-zero motion vector is assigned for the skip coding mode for the first segment; and the prediction for the first segment is formed by a motion compensated prediction with respect to the reference frame based at least in part on the predicted non-zero motion vector.

47. An encoder according to claim 10, wherein the motion estimation block further arranged to derive the predicted non-zero motion vector based at least in part on the motion vector of the second segment.

48. An encoder according to claim 10, wherein the motion estimation block further arranged to derive the predicted non-zero motion vector based at least in part on the motion vector of the second segment and motion vector of a third segment neighboring the first segment.

49. An encoder according to claim 10, wherein no residual information is provided for the first segment in the encoded bitstream.

50. An encoder according to claim 10, wherein the motion estimation block further arranged to derive a predicted motion vector based at least in part on the motion vector of the second segment and motion vector of a third segment neighboring the first segment; and
if any component of the predicted motion vector has an absolute value larger than a certain threshold value, the predicted motion vector is assigned for the skip coding mode of the first segment, and the prediction for the first segment is formed by a motion compensated prediction with respect to the reference frame based at least in part on the predicted motion vector; and
if none of components of the predicted motion vector has an absolute value larger than the certain threshold value, the zero motion vector is assigned for the skip coding mode of the first segment, and the prediction for the first segment is formed with respect to a corresponding segment of the reference frame associated with the zero motion vector.

51. An encoder according to claim 10, wherein if the second segment has a zero motion vector, the zero motion vector is assigned to the skip coding mode of the first segment and the prediction for the first segment is formed with respect to a corresponding segment of the reference frame associated with the zero motion vector.

52. An encoder according to claim 10, wherein if the second segment has a zero motion vector and the second segment is predicted using motion-compensated prediction from the reference picture, the zero motion vector is assigned to the skip coding mode of the first segment and the prediction for the first segment is formed with respect to a corresponding segment of the reference frame associated with the zero motion vector.

53. An encoder according to claim 10, wherein if the second segment has a zero motion vector and the second segment is predicted using motion-compensated prediction from a second reference picture immediately preceding the picture second segment belongs to, the zero motion vector is assigned to the skip coding mode of the first segment and the prediction for the first segment is formed with respect to a corresponding segment of the reference frame associated with the zero motion vector.

54. A decoder according to claim 16, wherein if the second segment has a zero motion vector, the zero-motion vector is assigned to the skip coding mode for the first segment and the prediction for the first segment is formed with respect to a corresponding segment of the reference frame associated with the zero motion vector.

55. A decoder according to claim 16, wherein if the second segment has a non-zero motion vector,
the motion compensated prediction block further arranged to derive the predicted non-zero motion vector based at least in part on the motion vector of the second segment; and the predicted non-zero motion vector is assigned for the skip coding mode for the first segment; and the prediction for the first segment is formed by a motion compensated prediction with respect to the reference frame based at least in part on the predicted non-zero motion vector.

56. A decoder according to claim 16, wherein the motion estimation block further arranged to:
perform an analysis of motion information of the second segment and motion information of a third segment neighboring the first segment;
determine whether a region surrounding the first segment has a global or a regional motion in a video sequence based at least in part on a characterictic of the motion vector of the second segment and the motion vector of the third segment.

57. A decoder according to claim 56, wherein if the region surrounding the first segment has a global or a regional motion in a video sequence,
the motion estimation block further arranged to derive the predicted non-zero motion vector based at least in part on the motion vector of the second segment and the motion vector of the third segment; and
the predicted non-zero motion vector is assigned for the skip coding mode for the first segment; and the prediction for the first segment is formed by a motion compensated prediction with respect to the reference frame based at least in part on the predicted non-zero motion vector.

58. A decoder according to claim 16, wherein the motion estimation block further arranged to derive the predicted non-zero motion vector based at least in part on the motion vector of the second segment.

59. A decoder according to claim 16, wherein the motion estimation block further arranged to derive the predicted non-zero motion vector based at least in part on the motion vector of the second segment and motion vector of a third segment neighboring the first segment.

60. A decoder according to claim 16, wherein no residual information is provided for the first segment in an encoded bitstream.

61. A decoder according to claim 16, wherein the motion estimation block further arranged to derive a predicted motion vector based at least in part on the motion vector of the second segment and motion vector of a third segment neighboring the first segment; and
if any component of the predicted motion vector has an absolute value larger than a certain threshold value, the predicted motion vector is assigned for the skip coding mode of the first segment, and the prediction for the first segment is formed by a motion compensated prediction with respect to the reference frame based at least in part on the predicted motion vector; and
if none of components of the predicted motion vector has an absolute value larger than the certain threshold value, the zero motion vector is assigned for the skip coding mode of the first segment, and the prediction for the first segment is formed with respect to a corresponding segment of the reference frame associated with the zero motion vector.

62. A decoder according to claim 16, wherein if the second segment has a zero motion vector and the second segment is predicted using motion-compensated prediction from the reference picture, the zero motion vector is assigned to the skip coding mode of the first segment and the prediction for the first segment is formed with respect to a corresponding segment of the reference frame associated with the zero motion vector.

63. A decoder according to claim 16, wherein if the second segment has a zero motion vector and the second segment is predicted using motion-compensated prediction from a second reference picture immediately preceding the picture second segment belongs to, the zero motion vector is assigned to the skip coding mode of the first segment and the prediction for the first segment is formed with respect to a corresponding segment of the reference frame associated with the zero motion vector.

64. A decoder according to claim 16, wherein no further motion vector information for the first segment is retrieved from an encoded bitstream.

65. A method according to claim 7, wherein no further motion vector information for the first segment is retrieved from the encoded bitstream.

* * * * *